(12) United States Patent
Kumazaki et al.

(10) Patent No.: US 10,576,964 B2
(45) Date of Patent: Mar. 3, 2020

(54) VEHICLE AND CONTROL METHOD FOR VEHICLE

(71) Applicant: TOYOTA JIDOSHA KABUSHIKI KAISHA, Toyota-shi, Aichi-ken (JP)

(72) Inventors: Kenta Kumazaki, Anjo (JP); Tooru Matsubara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 15/800,581

(22) Filed: Nov. 1, 2017

(65) Prior Publication Data
US 2018/0141540 A1    May 24, 2018

(30) Foreign Application Priority Data

Nov. 18, 2016 (JP) ................. 2016-225358

(51) Int. Cl.
*B60L 9/00* (2019.01)
*B60L 11/00* (2006.01)
(Continued)

(52) U.S. Cl.
CPC ............. *B60W 20/30* (2013.01); *B60K 6/365* (2013.01); *B60K 6/445* (2013.01); *B60K 6/48* (2013.01);
(Continued)

(58) Field of Classification Search
CPC ...... B60W 20/30; B60W 10/04; B60W 10/10; B60W 10/115; B60W 10/20;
(Continued)

(56) References Cited

U.S. PATENT DOCUMENTS 6,030,316 A    2/2000   Kadota
10,101,738 B2  10/2018  Kaspersky et al.
(Continued)

FOREIGN PATENT DOCUMENTS

DE   102006042419 A1    3/2008
DE   102009019795 A1 * 11/2010 ............ B60W 10/06
(Continued)

OTHER PUBLICATIONS

English Translation for DE102009019795A1.*
(Continued)

*Primary Examiner* — Mahmoud S Ismail
(74) *Attorney, Agent, or Firm* — Oliff PLC

(57) ABSTRACT

An electronic control unit suppresses gear shifting more significantly in a second travel mode than in a first travel mode. Accordingly, frequent gear shifting of an automatic transmission in the second travel mode is suppressed, and superior ride quality is obtained. Meanwhile, an amount of a hysteresis in a gear shifting map is smaller in the second travel mode than in the first travel mode. Thus, duration of travel at an optimum gear stage is extended in the second travel mode, and fuel economy is improved. That is, in the second travel mode, drive power responsiveness to an acceleration and deceleration operation as in the first travel mode is unnecessary. Thus, even when gear shifting is suppressed, there is a low possibility that a driver feels a sense of discomfort.

19 Claims, 14 Drawing Sheets

(51) Int. Cl.

| | |
|---|---|
| *G05D 1/00* | (2006.01) |
| *G05D 3/00* | (2006.01) |
| *G06F 7/00* | (2006.01) |
| *G06F 17/00* | (2019.01) |
| *B60W 20/30* | (2016.01) |
| *F16H 61/68* | (2006.01) |
| *F16H 63/50* | (2006.01) |
| *F16H 61/02* | (2006.01) |
| *F16H 61/16* | (2006.01) |
| *B60K 6/365* | (2007.10) |
| *B60K 6/445* | (2007.10) |
| *B60W 10/115* | (2012.01) |
| *F16H 61/10* | (2006.01) |
| *B60K 6/48* | (2007.10) |
| *B60K 6/547* | (2007.10) |
| *B60W 10/04* | (2006.01) |
| *B60W 10/10* | (2012.01) |
| *B60W 10/20* | (2006.01) |
| *B60W 50/08* | (2020.01) |
| *F16H 59/66* | (2006.01) |
| *B60W 30/14* | (2006.01) |
| *B60W 30/165* | (2020.01) |

(52) U.S. Cl.
CPC ............. *B60K 6/547* (2013.01); *B60W 10/04* (2013.01); *B60W 10/10* (2013.01); *B60W 10/115* (2013.01); *B60W 10/20* (2013.01); *B60W 50/082* (2013.01); *F16H 61/0213* (2013.01); *F16H 61/10* (2013.01); *F16H 61/16* (2013.01); *F16H 61/68* (2013.01); *F16H 63/50* (2013.01); *G05D 1/0088* (2013.01); *B60W 30/14* (2013.01); *B60W 30/165* (2013.01); *B60W 2520/10* (2013.01); *B60W 2710/1005* (2013.01); *B60Y 2200/92* (2013.01); *F16H 59/66* (2013.01); *G05D 2201/0213* (2013.01); *Y02T 10/6221* (2013.01); *Y02T 10/6239* (2013.01); *Y02T 10/7258* (2013.01); *Y02T 10/84* (2013.01); *Y10S 903/93* (2013.01)

(58) Field of Classification Search
CPC .. B60W 50/082; B60W 30/14; B60W 30/165; B60K 6/365; B60K 6/445; B60K 6/48; B60K 6/547; F16H 61/0213; F16H 61/10; F16H 61/16; F16H 63/50; F16H 61/68
USPC .......................................................... 701/22
See application file for complete search history.

(56) References Cited

U.S. PATENT DOCUMENTS

| | | | |
|---|---|---|---|
| 2002/0069009 | A1 | 6/2002 | Hellmann et al. |
| 2005/0101437 | A1* | 5/2005 | Wiethe .................. F16H 61/21 477/120 |
| 2013/0145482 | A1 | 6/2013 | Ricci et al. |
| 2013/0166131 | A1 | 6/2013 | Shiiba et al. |
| 2018/0066750 | A1 | 3/2018 | Nishimine |
| 2018/0164800 | A1 | 6/2018 | Kaspersky et al. |
| 2018/0337957 | A1 | 11/2018 | Chen |
| 2019/0018405 | A1 | 1/2019 | Kaspersky et al. |
| 2019/0039565 | A1 | 2/2019 | Kumazaki |

FOREIGN PATENT DOCUMENTS

| | | | | |
|---|---|---|---|---|
| DE | 102009019795 | A1 | 11/2010 | |
| EP | 1925487 | A2 | 5/2008 | |
| JP | H11-180182 | A | 7/1999 | |
| JP | 2000-127802 | A | 5/2000 | |
| JP | 2001-001787 | A | 1/2001 | |
| JP | 2001-334841 | A | 12/2001 | |
| JP | 2006-336717 | A | 12/2006 | |
| JP | 4305498 | B2 * | 7/2009 | ............ B60W 10/06 |
| JP | 4305498 | B2 | 7/2009 | |
| WO | 2012/032605 | A1 | 3/2012 | |
| WO | 2016/080452 | A1 | 5/2016 | |

OTHER PUBLICATIONS

English Translation for JP4305498B2.*
Jafamejad et al., "A Car Hacking Experiment: When Connectivity Meets Vulnerability", 2015, IEEE, p. 1-6 (Year: 2016).
U.S. Appl. No. 16/004,703, filed Jun. 11, 2018 in the name of Kenta Kumazaki.
Jun. 20, 2019 Office Action issued in U.S. Appl. No. 16/004,703.
Oct. 2, 2019 Notice of Allowance issued in U.S. Appl. No. 16/004,703.

* cited by examiner

|  | C1 | C2 | B1 | B2 | B3 |
|---|---|---|---|---|---|
| 1st | ○ |  |  |  | ○ |
| 2nd | ○ |  |  | ○ |  |
| 3rd | ○ |  | ○ |  |  |
| 4th | ○ | ○ |  |  |  |
| R |  | ○ |  |  | ○ |
| N |  |  |  |  |  |

(○ ENGAGEMENT)

|      | C1 | C2 | C3 | C4 | B1 | B2 |
|------|----|----|----|----|----|----|
| 1st  | O  |    |    |    |    | O  |
| 2nd  | O  |    |    |    | O  |    |
| 3rd  | O  |    | O  |    |    |    |
| 4th  | O  |    |    | O  |    |    |
| 5th  | O  | O  |    |    |    |    |
| 6th  |    | O  |    | O  |    |    |
| 7th  |    | O  | O  |    |    |    |
| 8th  |    | O  |    |    | O  |    |
| Rev1 |    |    | O  |    |    | O  |
| Rev2 |    |    |    | O  |    | O  |
| N    |    |    |    |    |    |    |

(O : ENGAGEMENT)

VEHICLE AND CONTROL METHOD FOR VEHICLE

INCORPORATION BY REFERENCE

The disclosure of Japanese Patent Application No. 2016-225358 filed on Nov. 18, 2016 including the specification, drawings and abstract is incorporated herein by reference in its entirety.

BACKGROUND

1. Technical Field

The disclosure relates to a vehicle having a second travel mode in which drive power control and gear shifting control of an automatic transmission are executed without depending on an acceleration/deceleration operation by a driver, and to a control method for a vehicle.

2. Description of Related Art

A vehicle control apparatus for a vehicle having: a drive power source; and an automatic transmission capable of establishing plural gear stages, each of which has a different gear ratio, has been known. The vehicle control apparatus can set: a first travel mode in which drive power control and gear shifting control of the automatic transmission are executed in accordance with an acceleration/deceleration operation by a driver; and a second travel mode in which a target travel state is set without depending on the acceleration/deceleration operation in a state where an occupant is present in the vehicle and in which the drive power control and the gear shifting control are executed. An apparatus described in Japanese Patent Application Publication No. 2001-334841 (JP 2001-334841 A) is one example thereof. Traveling by constant speed travel control corresponds to the second travel mode. In order to suppress an over-reactive gear shifting operation and hunting of the automatic transmission during traveling by the constant speed travel control, a technique for processing to slow a parameter (a target drive power signal) used for the gear shifting control has been proposed.

SUMMARY

However, in the case where only the processing to slow the parameter, which is used for the gear shifting control, is executed as described above, duration in which the vehicle travels at a different gear stage from an optimum gear stage defined by a gear shifting map or the like is extended. Thus, fuel economy is possibly degraded. In addition, in order to prevent degraded ride quality (a fluctuation in the drive power, vibrations, noise, and the like) caused by frequent gear shifting, a hysteresis is provided between an upshift condition and a downshift condition in the conventional gear shifting control using the gear shifting map or the like. However, because the vehicle control apparatus is designed with a premise of the acceleration/deceleration operation by the driver, the vehicle control apparatus may not be always appropriate for the second travel mode by the constant speed travel control, in which the driver does not perform the acceleration/deceleration operation, or the like. Thus, there is room for improvement. In addition, it is anticipated that higher performance is requested in terms of the ride quality and the fuel economy rather than drivability such as drive power performance as contribution of a driving operation by the driver is decreased. As a case where the contribution of the driving operation by the driver is decreased, an automatic driving travel mode in which the vehicle travels by automatically controlling a steering angle, and the like can be exemplified in addition to the drive power control and the gear shifting control.

The disclosure provides a vehicle control apparatus that can set a first travel mode and a second travel mode and that suppresses degradation of drivability while improving fuel economy in accordance with requested performance in each of the travel modes.

A first aspect of the disclosure is a vehicle. The vehicle includes a drive power source, an automatic transmission, and an electronic control unit. The automatic transmission is configured to establish plural gear stages, each of the plural gear stages has a different gear ratio. The electronic control unit is configured to execute a first travel mode and a second travel mode. The first travel mode is a mode in which drive power control and gear shifting control of the automatic transmission are executed in accordance with an acceleration and deceleration operation by a driver. The second travel mode is a mode in which a target travel state is set without depending on the acceleration and deceleration operation in a state where an occupant is present in the vehicle and in which the drive power control and the gear shifting control are executed. As a gear shifting condition of the gear shifting control, an upshift condition and a downshift condition are defined based on a parameter related to drive power and a parameter related to a vehicle speed. An amount of a hysteresis between a specified upshift condition and a specified downshift condition in the first travel mode differs from the amount of the hysteresis in the second travel mode. The electronic control unit is configured to make a gear shifting determination on whether to make gear shifting in the second travel mode in accordance with the gear shifting condition a the smaller amount of the hysteresis than the amount of the hysteresis in the first travel mode. The electronic control unit is configured to suppress gear shifting by at least one of the upshift condition and the downshift condition more significantly in the second travel mode than in the first travel mode.

With the configuration, gear shifting is suppressed more significantly in the second travel mode than in the first travel mode. Accordingly, frequent gear shifting of the gear stage of the automatic transmission in the second travel mode is suppressed, and superior ride quality is obtained. Meanwhile, because the amount of the hysteresis between the upshift condition and the downshift condition is smaller in the second travel mode than in the first travel mode, duration of travel at an optimum gear stage is extended in the second travel mode, and fuel economy is improved. That is, in the second travel mode, drive power responsiveness to the acceleration and deceleration operation as in the first travel mode is unnecessary. Thus, even when gear shifting is suppressed, there is a low possibility that the driver feels a sense of discomfort. Accordingly, even in the cases where the amount of the hysteresis of the gear shifting condition is decreased and where the gear shifting condition is set to extend the duration of the travel at the optimum gear stage, the drive power responsiveness expected by the driver is not hindered, and frequent gear shifting can be suppressed.

In the vehicle, the electronic control unit may be configured to suppress gear shifting by restricting an increase amount of the drive power in a specified time more significantly in the second travel mode than in the first travel mode. The specified time may be a time in which the drive power is increased.

With the configuration, the increase amount of the drive power during an increase in the drive power is more restricted in the second travel mode than in the first travel mode. Accordingly, in the second travel mode, a rapid change in the drive power is suppressed, and the ride quality is improved. In addition, downshifting that is associated with the increase in the drive power is suppressed, and frequent gear shifting is less likely to be made.

In the vehicle, the electronic control unit may be configured to make an upper limit of a change rate of the drive power in the specified time in the second travel mode smaller than the upper limit of the change rate of the drive power in the specified time in the first travel mode.

With the configuration, in the second travel mode, the upper limit of the change rate during the increase in the drive power is made smaller than that in the first travel mode. Accordingly, in the second travel mode, the rapid change in the drive power is suppressed, and the ride quality is improved. In addition, downshifting that is associated with the increase in the drive power is suppressed, and frequent gear shifting is less likely to be made. Furthermore, until the change rate reaches the upper limit, the drive power is changed in a similar manner to that in the first travel mode. Thus, drive power performance in the same degree as that in the first travel mode is secured.

In the vehicle, in a gear shifting restriction period, the electronic control unit may be configured to make an upper limit value of the drive power in the second travel mode smaller than the upper limit value of the drive power in the first travel mode. The gear shifting restriction period may be a predetermined period after the gear shifting is executed.

With the configuration, only in the predetermined gear shifting restriction period after gear shifting, the upper limit value of the drive power during the increase in the drive power is restricted to be smaller in the second travel mode than in the first travel mode. Accordingly, in the second travel mode, downshifting is suppressed, and frequent gear shifting is less likely to be made. In particular, in the configuration, the upper limit value of the drive power is restricted within a range where a current gear stage can be maintained based on the gear shifting condition. Accordingly, downshifting is reliably prohibited in the gear shifting restriction period, and frequent gear shifting is prevented.

In the vehicle, the electronic control unit may be configured to restrict the upper limit value of the drive power within the range where the current gear stage can be maintained based on the gear shifting condition in the second travel mode.

In the vehicle, the electronic control unit may be configured not to execute the gear shifting based on a specified condition when the electronic control unit determines to make gear shifting in the second travel mode.

With the configuration, when the gear shifting execution determination is made in the second travel mode, gear shifting is prohibited based on the specified condition. Thus, frequent gear shifting is suppressed.

In the vehicle, the electronic control unit may be configured not to execute the gear shifting until a delay time elapses. The delay time may be a time until the electronic control unit outputs a gear shifting command after the electronic control unit determines to make gear shifting. The delay time in the second travel mode may be longer than the delay time in the first travel mode.

In the vehicle, the electronic control unit may be configured not to execute the gear shifting until a determination number reaches a specified determination number. The determination number may be number for which the electronic control unit determines to make gear shifting. The specified determination number in the second travel mode may be greater than the specified determination number in the first travel mode.

In the vehicle, the electronic control unit may be configured not to execute the gear shifting when the electronic control unit determines to make gear shifting in a gear shifting restriction period. The gear shifting restriction period in the second travel mode may be longer than the gear shifting restriction period in the first travel mode.

In the vehicle, the electronic control unit may be configured to only suppress the downshifting by the downshift condition and permit the upshifting by the upshift condition.

With the configuration, the electronic control unit only suppresses the downshifting and permits the upshifting. Thus, while frequent gear shifting is suppressed by suppressing the downshifting, the fuel economy can be improved by the up shifting.

In the vehicle, the second travel mode may include plural travel modes in which contribution of a driving operation by the driver differs. The electronic control unit may be configured to make the gear shifting determination in accordance with the gear shifting condition with a smaller amount of the hysteresis in a first specified time than an amount of the hysteresis in a second specified time. The first specified time may be a time in the second travel mode in which the contribution of the driving operation is small. The second specified time may be a time in the second travel mode in which the contribution of the driving operation is large.

With the configuration, in the case where the plural travel modes in which the contribution of the driving operation by the driver differs are provided as the second travel mode, in the second travel mode in which the contribution of the driving operation is small, the gear shifting determination is made in accordance with the gear shifting condition with the smaller amount of the hysteresis than the amount of the hysteresis in the second travel mode in which the contribution of the driving operation is large. Accordingly, in the second travel mode in which the contribution of the driving operation is small, while frequent gear shifting is suppressed, the duration of the travel at the optimum gear stage is further extended. Thus, the fuel economy is further improved. That is, as the contribution of the driving operation is decreased, the drive power control is executed based on various types of information. For example, the drive power control can be executed by predicting situations (curves, up-downs, and the like) of a road ahead of a current position. Accordingly, the drive power is smoothly changed. Thus, while frequent gear shifting is suppressed, the amount of the hysteresis can further be decreased.

In the vehicle, the electronic control unit may be configured to increase a degree of suppression of gear shifting to be larger in the first specified time than in the second specified time.

With the configuration, in the second travel mode in which the contribution of the driving operation is small, the degree of the suppression of gear shifting is larger than the degree of the suppression of gear shifting in the second travel mode in which the contribution of the driving operation is large. Accordingly, even when the amount of the hysteresis is decreased in the second travel mode in which the contribution of the driving operation is small, frequent gear shifting is appropriately suppressed. Meanwhile, in the second travel mode in which the contribution of the driving operation is large, the degree of the suppression of gear shifting is small. Accordingly, the relatively high drive power responsiveness is obtained by gear shifting. Thus, the appropriate drive power responsiveness is obtained in accordance with the contribution of the driving operation.

In the vehicle, the second travel mode may include a constant speed travel mode and an automatic driving travel mode. The constant speed travel mode may be a mode in which the vehicle travels at a target vehicle speed set by the driver being the target travel state and in which the driver operates a steering angle. The automatic driving travel mode may be a mode in which, in addition to the drive power control and the gear shifting control, the vehicle travels by automatically controlling the steering angle based on road information. The electronic control unit may be configured to make a gear shifting determination in the automatic driving travel mode in accordance with the gear shifting condition with a smaller amount of the hysteresis than an amount of the hysteresis in the constant speed travel mode.

With the configuration, in the case where the constant speed travel mode and the automatic driving travel mode are provided as the second travel mode, in the automatic driving travel mode, the gear shifting determination is made in accordance with the gear shifting condition with the smaller amount of the hysteresis than the amount of the hysteresis in the constant speed travel mode. Accordingly, in the automatic driving travel mode, while frequent gear shifting is suppressed, the duration of the travel at the optimum gear stage is further extended. Thus, the fuel economy is further improved. That is, in the case of the automatic driving travel mode in which the steering angle is automatically controlled, the drive power control is executed by predicting the situations (the curves, the up-downs, and the like) of the road ahead of the current position. Accordingly, the drive power is further smoothly changed. Thus, while frequent gear shifting is suppressed, the amount of the hysteresis can further be decreased.

In the vehicle, the electronic control unit may be configured to increase a degree of suppression of gear shifting to be larger in the automatic driving travel mode than in the constant speed travel mode.

With the configuration, in the automatic driving travel mode, the degree of the suppression of gear shifting is larger than the degree of the suppression of gear shifting in the constant speed travel mode. Accordingly, even when the amount of the hysteresis is decreased in the automatic driving travel mode, frequent gear shifting is appropriately suppressed. Meanwhile, in the constant speed travel mode, the degree of the suppression of gear shifting is small. Accordingly, the relatively high drive power responsiveness is obtained by gear shifting. Thus, the appropriate drive power responsiveness can be secured, so as to suppress a change in the vehicle speed that gives the sense of discomfort to the driver.

In the vehicle, the second travel mode may include a following travel mode and an automatic driving travel mode. The following travel mode may be a mode in which target drive power that allows the vehicle to make a following travel with respect to a preceding vehicle is calculated in which the vehicle travels with the target drive power being the target travel state, and in which the driver operates a steering angle. The automatic driving travel mode may be a mode in which, in addition to the drive power control and the gear shifting control, the vehicle travels by automatically controlling the steering angle based on road information. The electronic control unit may be configured to make the gear shifting determination in the automatic driving travel mode in accordance with the gear shifting condition with a smaller amount of the hysteresis than an amount of the hysteresis in the following travel mode.

With the configuration, in the case where the following travel mode and the automatic driving travel mode are provided as the second travel mode, in the automatic driving travel mode, the gear shifting determination is made in accordance with the gear shifting condition with the smaller amount of the hysteresis than the amount of the hysteresis in the following travel mode. Accordingly, in the automatic driving travel mode, while frequent gear shifting is suppressed, the duration of the travel at the optimum gear stage is further extended. Thus, the fuel economy is further improved. That is, in the case of the automatic driving travel mode in which the steering angle is automatically controlled, the drive power control is executed by predicting the situations (the curves, the up-downs, and the like) of the road ahead of the current position. Accordingly, the drive power is further smoothly changed. Thus, while frequent gear shifting is suppressed, the amount of the hysteresis can further be decreased.

In the vehicle, the electronic control unit may be configured to increase a degree of suppression of gear shifting to be larger in the automatic driving travel mode than in the following travel mode.

With the configuration, in the automatic driving travel mode, the degree of the suppression of gear shifting is larger than the degree of the suppression of gear shifting in the following travel mode. Accordingly, even when the amount of the hysteresis is decreased in the automatic driving travel mode as in the configuration, frequent gear shifting is appropriately suppressed. Meanwhile, in the following travel mode, the degree of the suppression of gear shifting is small. Accordingly, the relatively high drive power responsiveness is obtained by gear shifting. Thus, the appropriate drive power responsiveness can be secured, so as to suppress a change in an inter-vehicular distance, which gives the sense of discomfort to the driver.

A second aspect of the disclosure is a control method for a vehicle. The vehicle includes a drive power source, an automatic transmission, and an electronic control unit. The automatic transmission is configured to establish plural gear stages, each of the plural gear stages has a different gear ratio. The control method includes: executing, by the electronic control unit, a first travel mode and a second travel mode; making, by the electronic control unit, a gear shifting determination on whether to make gear shifting in the second travel mode in accordance with a gear shifting condition with a smaller amount of the hysteresis than an amount of the hysteresis in the first travel mode by the electronic control unit; and suppressing, by the electronic control unit, gear shifting by at least one of an upshift condition and a downshift condition more significantly in the second travel mode than in the first travel mode. The first travel mode is a mode in which drive power control and gear shifting control of the automatic transmission are executed in accordance with an acceleration and deceleration operation by a driver. The second travel mode is a mode in which a target travel state is set without depending on the acceleration and deceleration operation in a state where an occupant is present in the vehicle and in which the drive power control and the gear shifting control are executed. As the gear shifting condition of the gear shifting control, the upshift condition and the downshift condition are defined based on a parameter related to drive power and a parameter related to a vehicle speed. An amount of a hysteresis between a specified upshift condition and a specified downshift condition in the first travel mode differs from the amount of the hysteresis in the second travel mode.

With the configuration, in the second travel mode, gear shifting is suppressed in comparison with the first travel mode. Accordingly, frequent gear shifting of the gear stage of the automatic transmission in the second travel mode is suppressed, and superior ride quality is obtained. Meanwhile, because the amount of the hysteresis between the upshift condition and the downshift condition is smaller in the second travel mode than in the first travel mode, duration of travel at an optimum gear stage is extended in the second travel mode, and fuel economy is improved. That is, in the second travel mode, drive power responsiveness to the acceleration and deceleration operation as in the first travel mode is unnecessary. Thus, even when gear shifting is suppressed, there is a low possibility that the driver feels the sense of discomfort. Accordingly, even in the cases where the amount of the hysteresis of the gear shifting condition is decreased and where the gear shifting condition is set to extend the duration of the travel at the optimum gear stage, the drive power responsiveness expected by the driver is not hindered, and frequent gear shifting can be suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
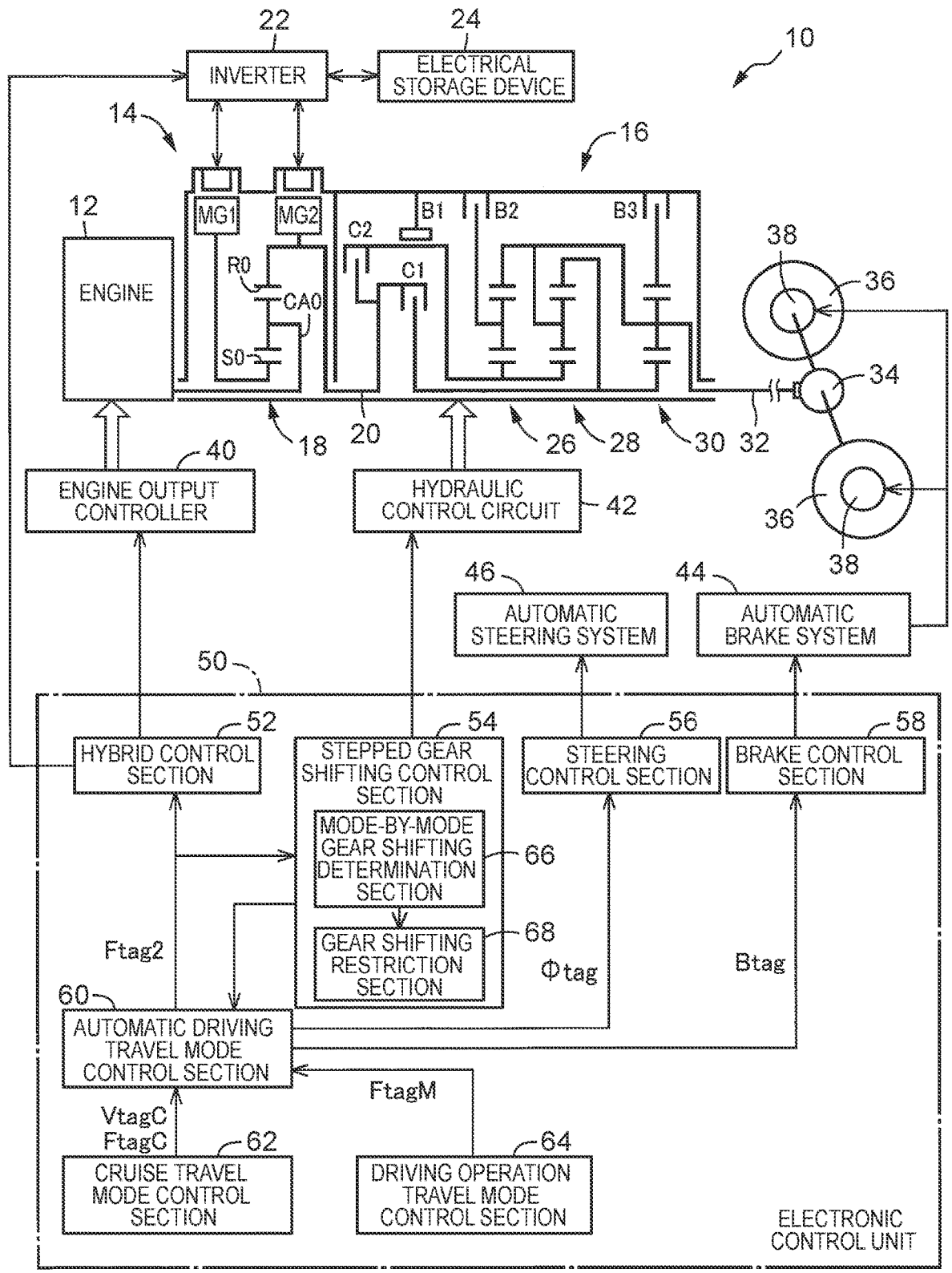
FIG. 1 is a skeletal view that illustrates a dedicated vehicular drive apparatus for a hybrid vehicle, to which the disclosure is applied, and is a view that shows a main section of a control system.

The disclosure is favorably applied to a hybrid vehicle that has an engine and a motor as drive power sources. However, the disclosure can also be applied to an engine-driven vehicle that only has the engine as the drive power source and to an electric vehicle that only has the motor as the drive power source. The engine is an internal combustion engine such as a gasoline engine or a diesel engine that generates power by combusting fuel. As the motor, a motor generator that can also be used as a generator is favorably used.

As an automatic transmission, a stepped automatic transmission of a planetary gear type, a parallel-shaft type, or the like that can establish plural gear stages in accordance with engaged/disengaged states of plural friction engagement devices is favorably used. A continuously variable transmission such as a belt-type continuously variable transmission can also set the plural gear stages, each of which has a different gear ratio, to achieve stepped gear shifting. An upshift condition and a downshift condition are defined on the basis of a parameter that is related to drive power and a parameter that is related to a vehicle speed. In addition, the upshift condition and the downshift condition are defined such that the gear stage is shifted to the gear stage on a lower speed side at the higher gear ratio as the drive power is increased and that the gear stage is shifted to a gear stage on the lower speed side as the vehicle speed is decreased. The parameter related to the drive power is an accelerator operation amount or drive power source torque (an engine throttle valve opening degree, motor torque, or the like) in a first travel mode, and is target drive power, target acceleration, target torque, the drive power source torque that is controlled in accordance with those, or the like in a second travel mode, for example. The accelerator operation amount or the drive power source torque is converted to the target drive power, the target acceleration, the target torque, or the like. Alternatively, the target drive power, the target acceleration, or the target torque is converted to the accelerator operation amount or the drive power source torque. In this way, the upshift condition and the downshift condition that are common regardless of a type of the travel mode are desirably set. As the parameter that is related to the vehicle speed, an output rotational speed that corresponds to the vehicle speed can be used, or an input rotational speed such as an engine speed can be used.

For example, a reference gear shifting condition for shifting the gear stage to the optimum gear stage, which is defined in accordance with fuel economy and the like, is set as the upshift condition. Then, the downshift condition is set by moving the upshift condition to a high drive power side and a low vehicle speed side. In this way, a hysteresis between the upshift condition and the downshift condition is provided. However, the hysteresis may be provided as follows: the downshift condition matches the reference gear shifting condition, and the upshift condition is set by moving the downshift condition to a low drive power side and a high vehicle speed side. Alternatively, the hysteresis may be provided by setting the upshift condition and the downshift condition in a manner to be placed on both sides of the reference gear shifting condition and move from the reference gear shifting condition.

A target travel state in the second travel mode includes a target vehicle speed, a target inter-vehicular distance, the target acceleration, the target torque, the target drive power, a target braking force, a target steering angle, and the like, for example. More specifically, the second travel mode may be a constant speed travel mode, a following travel mode, an automatic driving travel mode, or the like. In the constant speed travel mode, the target drive power is computed such that the vehicle travels at the target vehicle speed as set by a driver, and the vehicle thereby travels at a substantially constant vehicle speed. In the following travel mode, the target drive power is computed on the basis of an inter-vehicular distance from a preceding vehicle, and the vehicle thereby travels by following preceding vehicle at the predetermined target inter-vehicular distance. In the automatic driving travel mode, the target vehicle speed is successively set on the basis of road information and the like of a travel route to compute the target drive power, and a steering angle is automatically controlled for traveling. When the disclosure is implemented, any one of the second travel modes only has to be allowed. Instead of converting the accelerator operation amount or the drive power source torque to the target drive power, the accelerator operation amount or the drive power source torque may be converted to the target acceleration or the target torque, and the drive power control can thereby be executed.

In the constant speed travel mode and the following travel mode described above, an automatic steering system can be adopted. The automatic steering system automatically controls the steering angle by detecting a lane by a camera and the like so that the vehicle travels along the lane or switches the lane. This case corresponds to the automatic driving travel mode. In addition to this, the automatic driving travel mode also includes a case where the target vehicle speed is successively and automatically set on the basis of map information and travel route information, for example, the target drive power is computed in accordance with the target vehicle speed, and the steering angle is automatically controlled such that the vehicle travels by following the travel route. In the automatic driving travel mode, the vehicle may be parked in a garage or may be parallel-parked without an operation by the driver, and in neither of the cases, the map information and the travel route information are necessary. In addition, the vehicle may automatically be driven only from a parking lot or the like to a specified position such as in front of a front door by following the predetermined travel route. Thus, various aspects can be adopted. This automatic driving travel mode can include an unattended automatic driving travel mode in which no occupant including the driver is present in the vehicle, in addition to an attended automatic driving travel mode in which the occupant including the driver is present in the vehicle. The present disclosure includes the second travel mode in which at least the occupant is present in the vehicle.

A gear shifting suppression section is defined to only suppress a downshift by the downshift condition at a time when the drive power is increased and to permit an upshift by the upshift condition as is at a time when the drive power is decreased, for example. However, the gear shifting suppression section may permit the downshift as is and only suppress the upshift. Alternatively, the gear shifting suppression section may suppress both of the downshift and the upshift. The gear shifting suppression section can also suppress the downshift and/or the upshift associated with a change in the vehicle speed when necessary. Furthermore, the gear shifting suppression section can uniformly suppress gear shifting without distinguishing between a gear shifting execution determination by a change in the drive power and a gear shifting execution determination by the change in the vehicle speed when the gear shifting execution determination is made. Thus, various aspects can be adopted. The gear shifting suppression section is configured to suppress gear shifting by executing control such that a parameter used to determine the gear shifting condition does not satisfy the gear shifting condition or by prohibiting or delaying gear shifting, or the like when the parameter used to determine the gear shifting condition satisfies the gear shifting condition, for example.

In addition, the gear shifting suppression section is configured to suppress gear shifting only in a predetermined gear shifting restriction period after gear shifting or to suppress gear shifting by providing a delay time until a gear shifting command is output after the gear shifting execution determination is made or the number of the determinations, for example. In this way, the gear shifting suppression section can uniformly suppress next gear shifting without distinguishing between the upshift and the downshift. However, the gear shifting suppression section may only suppress either one of the upshift and the downshift. Furthermore, the gear shifting suppression section may only suppress at least one type of return gear shifting that includes the upshift after the downshift and the downshift after the upshift. Thus, various aspects can be adopted. In any of the above cases, the gear shifting restriction period or the delay time is extended, or the number of the determinations is increased such that gear shifting is suppressed more significantly in the second travel mode than in the first travel mode.

Between the automatic driving travel mode and the constant speed travel mode and between the automatic driving travel mode and the following travel mode, an amount of the hysteresis between the gear shifting conditions can be changed, and a degree of suppression of gear shifting can be changed. In addition, between the constant speed travel mode and the following travel mode, the amount of the hysteresis between the gear shifting conditions can be changed, and the degree of the suppression of gear shifting can be changed. For example, compared to the constant speed travel mode, there is a high possibility that the change in the drive power is increased in the following travel mode. Thus, it is considered to decrease the degree of the suppression of gear shifting and to increase the amount of the hysteresis between the gear shifting conditions in the following travel mode.

During the first travel mode, the gear shifting suppression section does not always have to suppress gear shifting, and there is no need to restrict an upper limit of a change rate of the drive power and to set an upper limit value of the drive power, for example. In addition, when a mode-by-mode gear shifting determination section makes the gear shifting execution determination, gear shifting may immediately be performed. Note that the change rate of the drive power corresponds to a change amount or the change rate of the drive power per unit time. The upper limit of the change rate of the drive power may be defined to have a constant value per travel mode. However, the upper limit of the change rate of the drive power may appropriately be changed by a driving condition of the vehicle, an operation condition of the driver, or the like. For example, the upper limit of the change rate may be changed in accordance with the vehicle speed or the like during starting or a kickdown, for example.

Figure 4:
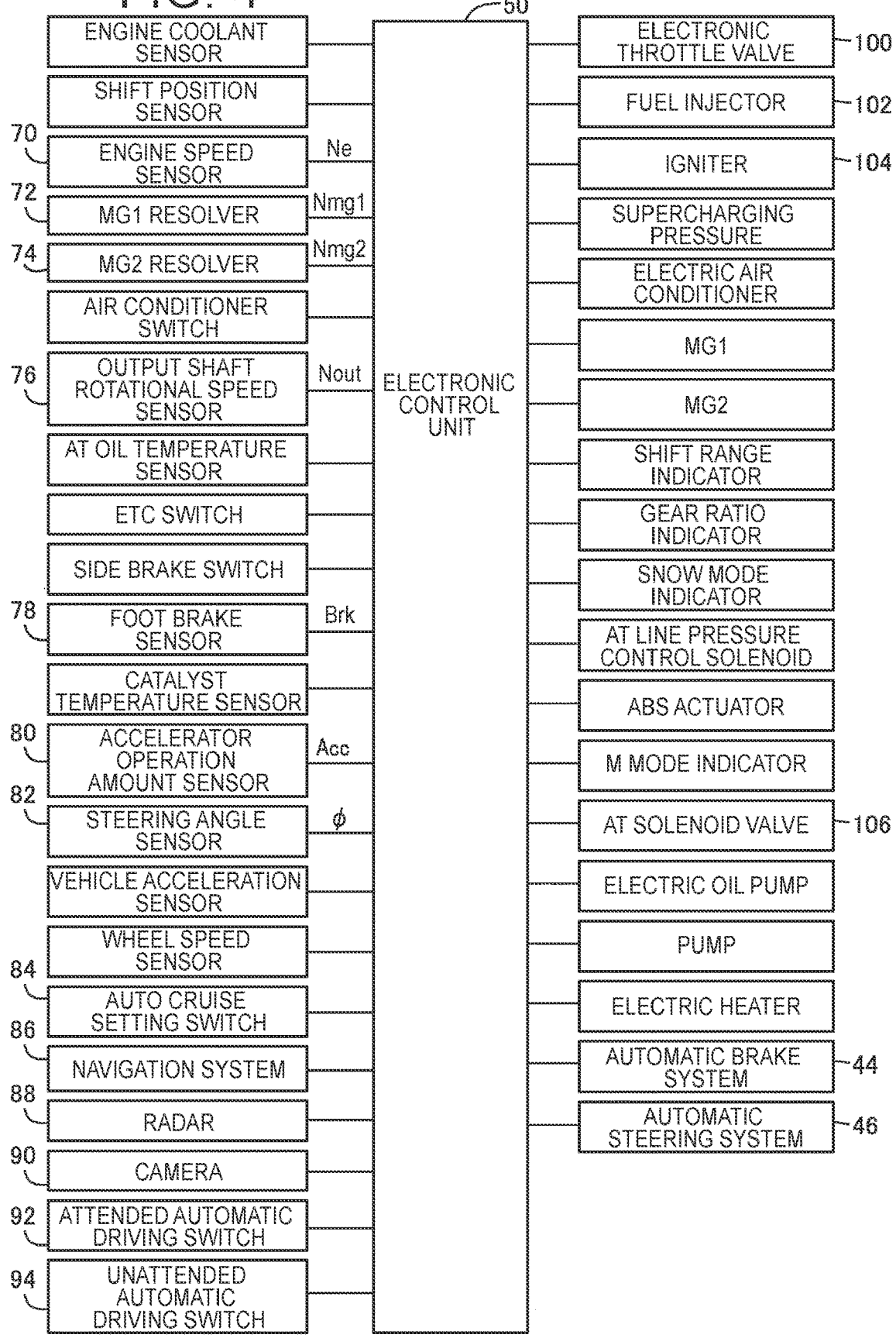
FIG. 4 is a diagram that illustrates one example of input/output signals of an electric control unit provided in the vehicular drive apparatus in FIG. 1.

A detailed description will hereinafter be made on an embodiment of the disclosure with reference to the drawings. FIG. 1 is a skeletal view of a dedicated vehicular drive apparatus 10 for a hybrid vehicle, to which the disclosure is applied, and is a view that shows a main section of a control system. This vehicular drive apparatus 10 includes an engine 12, an electric-type differential section 14, and an automatic transmission 16 in series. The engine 12 is an internal combustion engine such as a gasoline engine or a diesel engine, and output thereof is controlled by an engine output controller 40. The engine output controller 40 includes an electronic throttle valve 100, a fuel injector 102, an igniter 104, and the like that are shown in FIG. 4, for example. The engine output is electrically controlled when each of those electronic throttle valves 100, fuel injector 102, igniter 104, and the like is controlled in accordance with a control signal supplied from an electronic control unit 50. The electric-type differential section 14 includes a planetary gear device 18 of a single pinion type as a differential gear mechanism. The planetary gear device 18 includes a carrier CA0, a sun gear S0, and a ring gear R0 in a manner to allow differential rotation thereof, the carrier CA0 being coupled to the engine 12, the sun gear S0 being coupled to a first motor generator MG1, and the ring gear R0 being coupled to an intermediate transmission member 20. A second motor generator MG2 is coupled to the intermediate transmission member 20. Note that each of the electric-type differential section 14 and the automatic transmission 16 is configured to be substantially symmetrical about an axis thereof, and thus a lower half thereof is not shown in the skeletal view of FIG. 1.

Figures 2, 3:
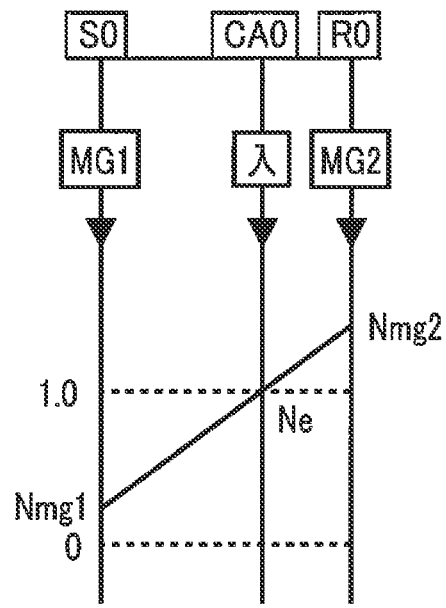
FIG. 2 is a collinear diagram that illustrates a relative rotational speed of each rotation element of an electric-type differential section in FIG. 1.
FIG. 3 is an engagement actuation table that illustrates plural gear stages of an automatic transmission and friction engagement devices for establishing the plural gear stages in FIG. 1.

FIG. 2 is a collinear diagram in which rotational speeds of the three rotation elements S0, CA0, R0 of the electric-type differential section 14 can be connected by a straight line. A rotational speed Nmg1 of the sun gear S0 corresponds to a rotational speed of the first motor generator MG1 (an MG1 rotational speed). A rotational speed Ne of the carrier CA0 corresponds to a speed of the engine 12 (an engine speed). A rotational speed Nmg2 of the ring gear R0 corresponds to a rotational speed of the second motor generator MG2 (an MG2 rotational speed). By regenerative torque control or powering torque control of the first motor generator MG1 and the second motor generator MG2, the MG2 rotational speed Nmg2, which is a differential output rotational speed with respect to the engine speed Ne as a differential input rotational speed, can continuously be changed in a stepless manner. In other words, the electric-type differential section 14 functions as an electric-type continuously variable transmission that can continuously change a gear ratio γ0 (=Ne/Nmg2). Each of the first motor generator MG1 and the second motor generator MG2 is connected to an electrical storage device 24, which can be charged/discharged, via an inverter 22, and motor torque thereof is electrically controlled in accordance with a motor control signal supplied from the electronic control unit 50. Each of these motor generators MG1 and MG2 has a function as the motor and the generator. The first motor generator MG1 is primarily used as the generator and generates a reaction force, and the second motor generator MG2 is primarily used as the motor and outputs the drive power. The engine 12, the electric-type differential section 14, and the second motor generator MG2 each function as a drive power source of the vehicular drive apparatus 10. Note that, in this embodiment, the engine 12, the first motor generator MG1, and the second motor generator MG2 are respectively and directly coupled to the carrier CA0, the sun gear S0, and the ring gear R0; however, a transmission gear, a clutch, or the like may be interposed therebetween.

The automatic transmission 16 is the stepped transmission of the planetary gear type, changes a speed of rotation of the intermediate transmission member 20, and outputs the changed speed from an output shaft 32. More specifically, the automatic transmission 16 includes a first planetary gear device 26 of the single pinion type, a second planetary gear device 28 of the single pinion type, and a third planetary gear device 30 of the single pinion type. In addition, the automatic transmission 16 is provided with two clutches C1, C2 and three brakes B1, B2, B3 (hereinafter simply referred to as clutches C and brakes B when not particularly distinguished) as hydraulic friction engagement devices. As shown in an engagement actuation table of FIG. 3, when any two of those clutches C and brakes B are engaged, four forward gear stages 1st to 4th and a reverse gear stage R (reverse) are established. The four forward gear stages 1st to 4th and the reverse gear stage R each have a different gear ratio γ1 (=Nmg2/Nout) that is a ratio between the rotational speed Nmg2 of the intermediate transmission member 20 and a rotational speed (an output rotational speed) Nout of the output shaft 32. When all of those are disengaged, N (neutral) in which power transmission is cut is established. The clutches C and the brakes B are engaged when a hydraulic pressure is supplied to each thereof from a hydraulic control circuit 42. In addition, the clutches C and the brakes B are controlled for engagement/disengagement when an AT solenoid valve 106 (see FIG. 4) and the like of the hydraulic control circuit 42 are electrically controlled in accordance with a gear shifting control signal supplied from the electronic control unit 50. The AT solenoid valve 106 is separately arranged for each of the clutches C and the brakes B, for example. The above output shaft 32 is coupled to right and left drive wheels 36 via a final reduction gear 34.

In such a vehicular drive apparatus 10, the electric-type differential section 14 and the automatic transmission 16 as entirety can execute continuously variable transmission control. In addition, the electric-type differential section 14 and the automatic transmission 16 as the entirety can execute gear shifting control that is similar to stepped gear shifting when controlling the MG1 rotational speed Nmg1 and the like such that the gear ratio of the electric-type differential section 14 becomes constant. In either of the cases, in order to promptly and smoothly perform gear shifting at a time of gear shifting of the automatic transmission 16, in response to a change in the rotational speed of the intermediate transmission member 20 that is associated with gear shifting thereof, the rotational speed of each section of the electric-type differential section 14, such as the MG1 rotational speed Nmg1, is controlled.

The vehicular drive apparatus 10 of this embodiment also includes an automatic brake system 44 and an automatic steering system 46. The automatic brake system 44 electrically controls a brake force, that is, a brake hydraulic pressure of a wheel brake 38 that is provided in each of the drive wheels 36 and driven wheels (non-drive wheels), which are not shown, in accordance with a brake control signal supplied from the electronic control unit 50. In addition, when a depressing operation of a brake pedal, which is not shown, is performed by a foot, the wheel brake 38 is supplied with the brake hydraulic pressure via a brake master cylinder and mechanically generates the brake force that corresponds to the brake hydraulic pressure, that is, a brake operation amount Brk. The automatic steering system 46 electrically controls a steering angle $\Phi$ by the motor and the like in accordance with a steering angle control signal supplied from the electronic control unit 50. The steering angle $\Phi$ may be a rotation angle of a steering wheel or an angle of the steering wheel.

The electronic control unit 50 functions as a controller that executes various types of control for the vehicular drive apparatus 10 of this embodiment, and the various types of the control include output control of the engine 12, the torque control of the motor generators MG1, MG2, the gear shifting control of the automatic transmission 16, brake force control by the automatic brake system 44, steering control by the automatic steering system 46, and the like. The electronic control unit 50 is configured by including a microcomputer that includes a CPU, ROM, RAM, an input/output interface, and the like, and executes signal processing in accordance with a program that is stored in the ROM in advance while using a temporary storage function of the RAM. When necessary, the electronic control unit 50 can also be configured to be separated for engine control, motor control, the gear shifting control, and the like.

FIG. 4 exemplifies signals received by the electronic control unit 50 and signals output from the electronic control unit 50. When some of them are specifically described, an engine speed sensor 70, an MG1 resolver 72, an MG2 resolver 74, an output shaft rotational speed sensor 76, a foot brake sensor 78, an accelerator operation amount sensor 80, and a steering angle sensor 82 are connected to the electronic control unit 50, and signals representing the engine speed Ne, the MG1 rotational speed Nmg1, the MG2 rotational speed Nmg2, the rotational speed (the output rotational speed) Nout of the output shaft 32, a depressing operation force (the brake operation force) Brk of the brake pedal, a depressing operation amount (an accelerator operation amount) Acc of an accelerator pedal, and the steering angle $\Phi$ are supplied to the electronic control unit 50 therefrom. In addition, an auto cruise setting switch 84 is a device that performs a selecting operation of a cruise travel mode in which the vehicle makes a constant speed travel or a following travel without depending on an acceleration/deceleration operation by the driver, sets a target vehicle speed VtagC, increases/decreases the target vehicle speed VtagC, sets a target inter-vehicular distance DtagC during the following travel, and the like. For example, the auto cruise setting switch 84 is disposed on the steering wheel or the like, and signals thereof that represent the target vehicle speed VtagC, the target inter-vehicular distance DtagC, and the like are supplied to the electronic control unit 50. In this cruise travel mode, the vehicle travels while the driver performs a steering operation. A navigation system 86 includes the map information, sets the travel route in accordance with a destination, shows a map and the travel route on a display that is disposed on an instrument panel or the like, and obtains various types of road traffic information such as a host vehicle position, traffic jam, a road gradient, altitude, a legal speed, signal information, and weather by a global positioning system (GPS), a vehicle information and communication system (VICS), vehicle-to-vehicle communication, road-vehicle communication, and the like. Signals representing those types of the information are supplied to the electronic control unit 50. An operation member that allows various types of selecting operations, setting operations, and the like through a touch operation, a pressing operation, a rotating operation, and the like is provided on the display or in vicinity thereof. When necessary, information communication equipment that receives information from the outside may separately be provided from the navigation system 86. A radar 88 detects the inter-vehicular distance from each of the preceding vehicle and a following vehicle, pedestrians near the host vehicle, or a distance from an obstacle. Signals representing those types of information are supplied to the electronic control unit 50. A camera 90 is a movie camera, a still camera, or the like that captures images of a forward area and a rear area of the vehicle, other vehicles and the pedestrians present on sides and the like thereof, the obstacle, the signal, the lane, a guardrail, a parking position, a predetermined mark, and the like. Signals representing those types of visual information are supplied to the electronic control unit 50.

An attended automatic driving switch 92 is a switch that selects the automatic driving travel mode in which the vehicle travels by automatically controlling the drive power of the vehicle and the steering angle $\Phi$ in a state where the driver or the occupant is present in the vehicle. An unattended automatic driving switch 94 is a switch that selects the automatic driving travel mode in which the vehicle travels by automatically controlling the drive power of the vehicle and the steering angle $\Phi$ in a state where the driver or the occupant is absent. For example, this unattended automatic driving switch 94 is incorporated in a wireless key that locks and unlocks a door of the vehicle wirelessly, or the like. In these types of automatic driving, the target vehicle speed is successively and automatically set on the basis of the map information, the travel route information, the various types of the road traffic information, and the like, for example, the target drive power is computed in accordance with the target vehicle speed, and the steering angle $\Phi$ is automatically controlled on the basis of the road information and the like such that the vehicle travels along the travel route. However, in these types of the automatic driving, the vehicle may be parked in the garage or may be parallel-parked without the operation by the driver, and in neither of the cases, the map information and the travel route information are necessary. In addition, the vehicle may automatically be driven only from the parking lot or the like to the specified position such as in front of the front door by following the predetermined travel route. Thus, the various aspects can be adopted. A case where the lane is detected by the camera 90 or the like and the steering angle $\Phi$ is automatically controlled in the cruise travel mode such that the vehicle travels along the lane or switches the lane also corresponds to the automatic driving travel mode. The lane that is detected by the camera 90 or the like is also the road information. The unattended automatic driving travel mode is appropriate when the vehicle is parked in the garage, is driven from the parking lot, and the like. The unattended automatic driving travel mode is also favorably adopted in a case of a convoy travel (the following travel) in which the vehicle follows a preceding guiding vehicle, for example. These attended automatic driving switch 92 and unattended automatic driving switch 94 may be incorporated in the navigation system 86. In this way, the attended automatic driving travel mode or the unattended automatic driving travel mode can be selected by the navigation system 86. In addition, some or all functions of the auto cruise setting switch 84 can be incorporated in the navigation system 86.

The above electronic control unit 50 outputs an engine control signal to the engine output controller 40 (see FIG. 1) that controls the engine output. In this way, a throttle valve opening degree of the electronic throttle valve 100, a fuel supply amount by the fuel injector 102, ignition timing of the engine 12 by the igniter 104, and the like in the engine 12 are electrically controlled. When the motor control signal is output to the inverter 22, the motor torque of each of the first motor generator MG1 and the second motor generator MG2 is separately and electrically controlled. The gear shifting control signal is output to the AT solenoid valves 106 and the like of the hydraulic control circuit 42, and the clutches C and the brakes B are each controlled for the engagement/the disengagement. In this way, the specified gear stage of the automatic transmission 16 is electrically established. The brake control signal is output to the automatic brake system 44, and the brake force of each of the wheel brakes 38 is electrically controlled. The steering angle control signal is output to the automatic steering system 46, and the steering angle Φ is electrically controlled by the motor and the like.

As shown in FIG. 1, this electronic control unit 50 functionally includes a hybrid control section 52, a stepped gear shifting control section 54, a steering control section 56, a brake control section 58, an automatic driving travel mode control section 60, a cruise travel mode control section 62, and a driving operation travel mode control section 64. The hybrid control section 52 computes target engine output on the basis of transmission loss in each of the sections, an auxiliary load, the gear ratio γ0 of the electric-type differential section 14, assist torque of the second motor generator MG2, the gear stage (the gear ratio γ1) of the automatic transmission 16, and the like such that the vehicle is driven by target drive power Ftag2 supplied from the automatic driving travel mode control section 60. Then, the hybrid control section 52 controls the engine 12 via the engine output controller 40 so as to realize the engine speed Ne and engine torque Te, with which the target engine output can be obtained. The gear ratio γ0 of the electric-type differential section 14 is defined such that the engine 12 is actuated within an efficient actuation range. In the case of the unattended or attended automatic driving travel mode, the target drive power Ftag2 is successively set on the basis of the various types of the road traffic information, such as the legal speed the road gradient, and the like such that the vehicle travels along the predetermined travel route, and the target drive power Ftag2 is successively set by a target vehicle speed calculation section 112, a feed-forward (F/F) control calculation section 132, a feedback (F/B) control calculation section 134, a mode-by-mode drive power control section 138, and the like in FIG. 15 that illustrates functions of the automatic driving travel mode control section 60. In addition, during the constant speed travel in the cruise travel mode, the vehicle travels at the target vehicle speed VtagC, which is set in advance. During the following travel mode in the cruise travel mode, the target drive power Ftag2 is successively set such that the vehicle makes the following travel while keeping the predetermined target inter-vehicular distance DtagC. During a driving operation travel mode in which the drive power is controlled in accordance with the acceleration/deceleration operation (an accelerator operation and a brake operation) by the driver, target drive power FtagM is successively computed from the accelerator operation amount Acc, a vehicle speed V, and the like, and the target drive power Ftag2 is set on the basis of the target drive power FtagM. The target vehicle speed VtagC and the target inter-vehicular distance DtagC are set by the cruise travel mode control section 62 on the basis of a signal from the auto cruise setting switch 84. The target drive power FtagM is successively computed by the driving operation travel mode control section 64 on the basis of the accelerator operation amount Acc, the vehicle speed V, and the like. The target inter-vehicular distance DtagC is selected from three stages of large, medium, and small, for example, and each of the stages thereof is variably set in accordance with the vehicle speed V. The cruise travel mode control section 62 computes target drive power FtagC by feedback control or the like such that an actual inter-vehicular distance D from the preceding vehicle, which is detected by the radar 88, becomes the target inter-vehicular distance DtagC, and the target drive power Ftag2 is set on the basis of the target drive power FtagC. Note that, when the target drive power Ftag2 is negative (minus), a drive power source brake is generated by engine braking or regenerative control of the second motor generator MG2 and is added with the brake force of each of the wheel brakes 38, which is controlled by the brake control section 58, so as to obtain the target drive power Ftag2. The electronic control unit 50 has a function of a vehicle control apparatus that allows the vehicle to travel in any of the plural travel modes.

Figure 6:
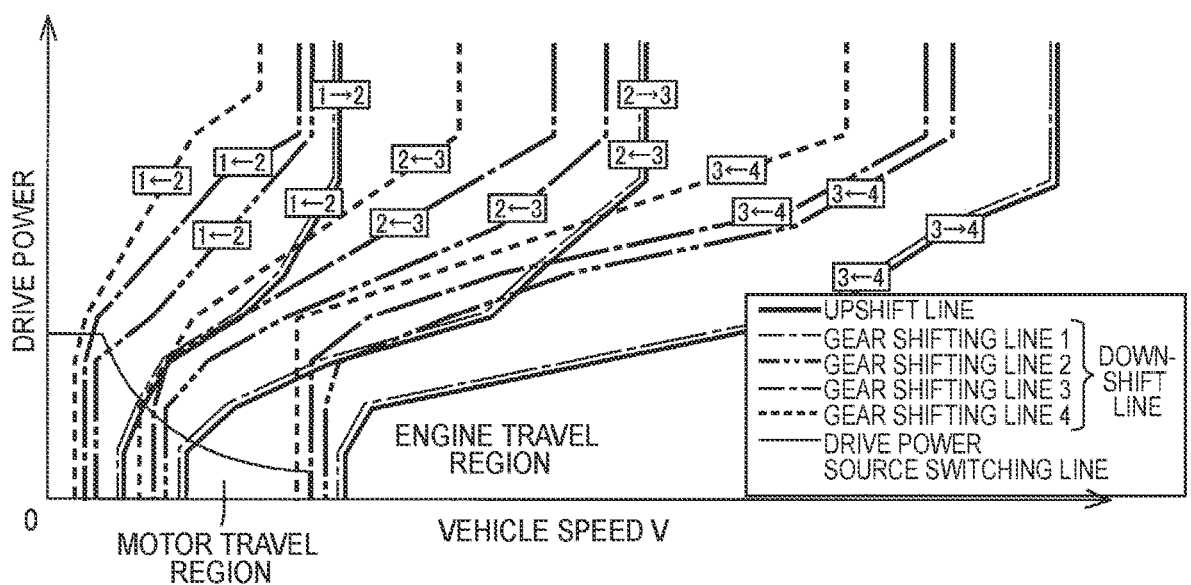
FIG. 6 is a chart that illustrates one example of a gear shifting map during driving travel that is set in steps Q8 to Q11 in FIG. 5, and is a chart that illustrates one example of a drive power source switching map used to switch between engine travel and motor travel.

In addition, in a low output torque range or a low vehicle speed range where engine efficiency is relatively low, the hybrid control section 52 stops the engine 12 or brings the engine 12 into an idling state and switches the drive power source in accordance with a predetermined drive power source switching map such that the vehicle travels by only using the second motor generator MG2 as the drive power source. A thin line that is shown in a lower left portion (a region with the low drive power and at the low vehicle speed) of FIG. 6 is one example of the drive power source switching map and is defined on the basis of the vehicle speed V and the drive power (corresponding to the accelerator operation amount Acc and the throttle valve opening degree). In this example, the region at the low vehicle speed and with the low drive power is set as a motor travel region, and in this region, switching control of the drive power source is executed by starting or stopping the engine 12, or the like. Although not shown, a hysteresis is provided between a switching line, on which motor travel is switched to engine travel, and a switching line, on which the engine travel is switched to the motor travel, in order to prevent frequent gear shifting. In addition, even during the engine travel in which the vehicle travels by using the engine 12 as the drive power source, electrical energy from the first motor generator MG1, which is subjected to the regenerative control, and/or electrical energy from the electrical storage device 24 is supplied to the second motor generator MG2, and torque is applied to the drive wheels 36 through driving (powering control) of the second motor generator MG2. In this way, torque assist is executed to assist the power of the engine 12. In other words, when necessary, the torque assist by the second motor generator MG2 is also executed in engine travel region in FIG. 6.

The stepped gear shifting control section 54 executes the gear shifting control of the automatic transmission 16 in accordance with a predetermined gear shifting map, and executes engagement/disengagement control of the clutches C and the brakes B via the AT solenoid valves 106 of the hydraulic control circuit 42, so as to establish a target gear stage Gtag that is obtained in accordance with the gear shifting map. This stepped gear shifting control section 54 functionally includes a mode-by-mode gear shifting determination section 66 and a gear shifting restriction section 68. The mode-by-mode gear shifting determination section 66 sets the gear shifting map in accordance with the travel mode and sets the target gear stage Gtag in accordance with the gear shifting map. The mode-by-mode gear shifting determination section 66 executes the signal processing in accordance with steps Q1 to Q12 (hereinafter simply referred to as Q1 to Q12) of a flowchart in FIG. 5, for example.

Figure 5:
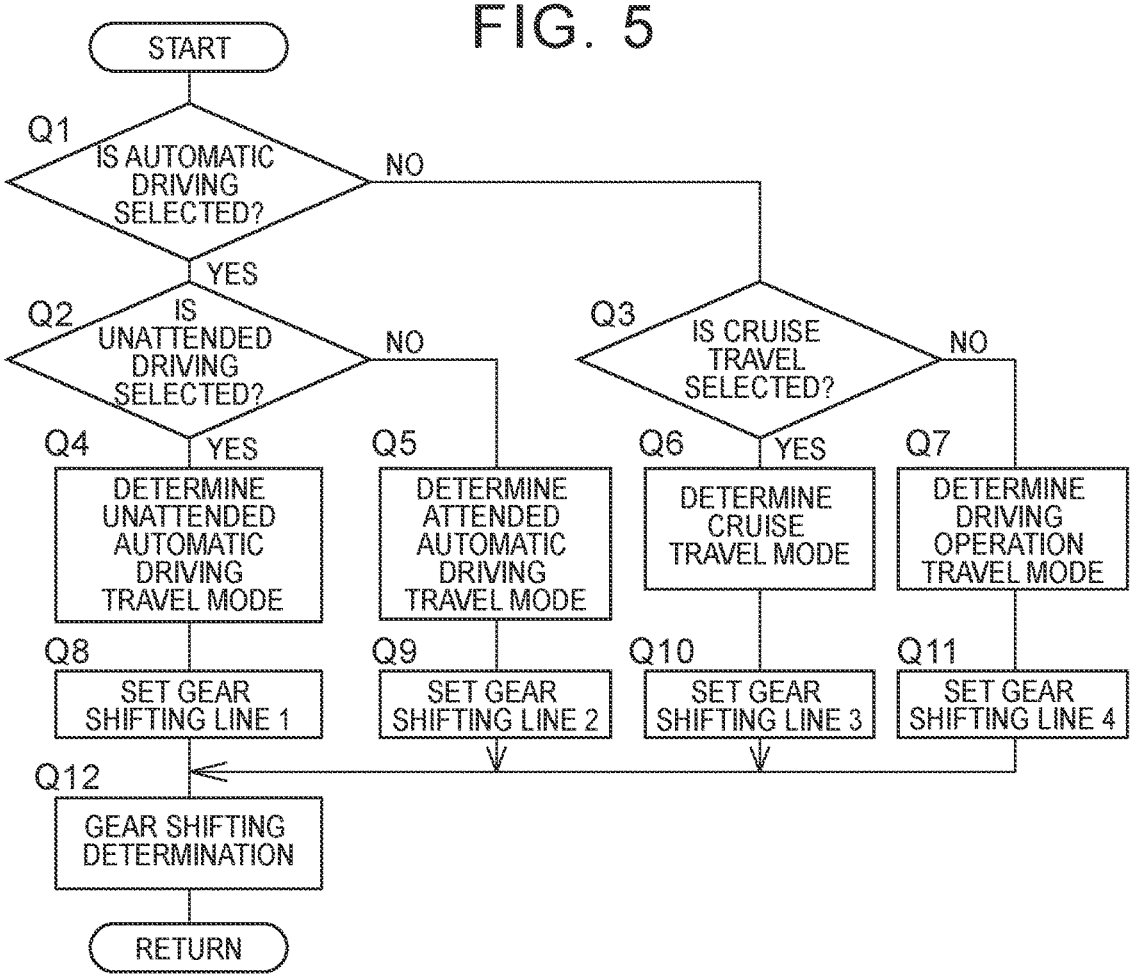
FIG. 5 is a flowchart that specifically illustrates contents of signal processing executed by a mode-by-mode gear shifting determination section of a stepped gear shifting control section in FIG. 1.

In Q1 of FIG. 5, it is determined whether the automatic driving travel mode is selected by determining whether either one of the attended automatic driving switch 92 and the unattended automatic driving switch 94 is operated to be ON. If the automatic driving travel mode is selected, Q2 is executed. Then, it is determined whether the unattended automatic driving travel mode is selected by determining whether the unattended automatic driving switch 94 is operated to be ON. If the unattended automatic driving switch 94 is operated to be ON, it is determined in Q4 that the unattended automatic driving travel mode is selected. If the unattended automatic driving switch 94 is not operated to be ON, it is determined in Q5 that the attended automatic driving travel mode is selected. Meanwhile, if the determination in Q1 is NO (negative), that is, if the automatic driving travel mode is not selected, Q3 is executed. Then, it is determined whether the cruise travel mode is selected by determining whether the selecting operation is performed by the auto cruise setting switch 84. If the selecting operation is performed by the auto cruise setting switch 84, it is determined in Q6 that the cruise travel mode is selected. If the selecting operation is not performed by the auto cruise setting switch 84, it is determined in Q7 that a normal travel mode, that is, the driving operation travel mode, in which the drive power control and the gear shifting control are executed in accordance with the acceleration/deceleration operation by the driver and the steering angle Φ is changed in accordance with the steering operation, is selected. The attended automatic driving travel mode and the cruise travel mode described above each correspond to the second travel mode in which the target travel state (the target vehicle speed, the target inter-vehicular distance, the target drive power, the target steering angle, and the like) is set without depending on the acceleration/deceleration operation in the state where the occupant is present in the vehicle and in which the drive power control and the gear shifting control are executed. The driving operation travel mode corresponds to the first travel mode in which the drive power control and the gear shifting control are executed in accordance with the acceleration/deceleration operation by the driver.

If it is determined that the unattended automatic driving travel mode is selected in Q4, a gear shifting line 1 is set in Q8. If it is determined that the attended automatic driving travel mode is selected in Q5, a gear shifting line 2 is set in Q9. If it is determined that the cruise travel mode is selected in Q6, a gear shifting line 3 is set in Q10. If it is determined that the driving operation travel mode is selected in Q7, a gear shifting line 4 is set in Q11. The gear shifting lines define the gear shifting conditions. FIG. 6 is one example of the gear shifting map in which upshift lines (solid lines) and downshift lines (the gear shifting lines 1 to 4) are defined as the gear shifting lines, is defined on the basis of the vehicle speed V and the drive power, and is defined such that the gear stage is switched to the gear stage on a higher speed side at the lower gear ratio γ1 as the vehicle speed V is increased and that the gear stage is switched to the gear stage on a lower speed side at the higher gear ratio γ1 as the drive power is increased. While the actual drive power can be estimated from the engine torque, the motor torque, the gear stage of the automatic transmission 16, and the like, in this embodiment, the drive power is determined by using the target drive power Ftag2 that is computed in the automatic driving travel mode control section 60. The upshift lines each correspond to the upshift condition, and the downshift lines each correspond to the downshift condition. In addition, the upshift lines and the downshift lines are set on the basis of a torque characteristic of the engine 12 and the like so as to be able to achieve a balance between the fuel economy and drive power performance, for example. Furthermore, in order to prevent degraded ride quality caused by frequent gear shifting and the like, a hysteresis is provided between the upshift line and the downshift line that are related to up/down between the same gear stages. More specifically, the hysteresis is provided such that the 4→3 downshift line moves in a high drive power direction and also moves in a direction of the low vehicle speed V from the 3→4 upshift line. The similar hysteresis is provided between the 3→2 downshift line and the 2→3 upshift line and between the 2→1 downshift line and the 1→2 upshift line. In this embodiment, this hysteresis is provided by defining each of the upshift lines in accordance with the reference gear shifting condition for shifting the gear stage to the optimum gear stage and by moving each of the downshift lines to the low vehicle speed side and the high drive power side from the upshift line.

The gear shifting lines 1 to 4, which are set in Q8 to Q11, are the downshift lines, and amounts of the hysteresis thereof that influence frequent gear shifting differ. In this embodiment, the amounts of the hysteresis from the common upshift line are set to satisfy a relationship of the gear shifting line 1<the gear shifting line 2<the gear shifting line 3<the gear shifting line 4. That is, when the amount of the hysteresis is increased, frequent gear shifting is suppressed. However, duration of the travel at the optimum gear stage is shortened, and the fuel economy is possibly degraded. For this reason, the amount of the hysteresis is suppressed to minimum necessity in accordance with the travel mode. More specifically, as contribution of the driving operation by the driver is decreased, the drive power control can be executed by predicting acceleration/deceleration of the vehicle on the basis of the travel route and the like, and a rapid change in the drive power is decreased. Thus, the amount of the hysteresis can be decreased.

In the unattended automatic driving travel mode, the occupant is absent, and there is no need to consider degradation of the ride quality caused by frequent gear shifting when compared to the attended travel. Accordingly, the fuel economy can be improved by setting the gear shifting line 1 with the small amount of the hysteresis. The amount of the hysteresis can also be set to zero (the same as the upshift line). In the attended automatic driving travel mode in which the occupant is present, the degradation of the ride quality caused by frequent gear shifting is taken into consideration. Accordingly, the gear shifting line 2 with the large amount of the hysteresis has to be set. Meanwhile, the drive power control can be executed by predicting the acceleration/deceleration on the basis of the travel route and the like, and the rapid change in the drive power is decreased. Thus, while frequent gear shifting is suppressed, the amount of the hysteresis can be decreased when compared to that in the driving operation travel mode. In the cruise travel mode, the drive power control is executed such that the vehicle travels at the target vehicle speed VtagC and makes the following travel with respect to the preceding vehicle while keeping the target inter-vehicular distance DtagC. Accordingly, there is a tendency that the change in the drive power becomes more significant than that in the automatic driving travel mode. Thus, the gear shifting line 3 with the larger amount of the hysteresis than that in the automatic driving travel mode is set. However, compared to the driving operation travel mode in which the driver performs the acceleration/deceleration operation in real time, a frequency of the rapid change in the drive power is low. Thus, while frequent gear shifting is suppressed, the amount of the hysteresis can be made smaller than that in the driving operation travel mode. In the driving operation travel mode, because the driver himself/herself makes an acceleration/deceleration request, the frequency of the rapid change in the drive power is high. Thus, the gear shifting line 4 with the large amount of the hysteresis is set to suppress the degraded ride quality caused by frequent gear shifting. Note that the common gear shifting line may be set as the gear shifting line 2 in the attended automatic driving travel mode and the gear shifting line 3 in the cruise travel mode.

Then, in next Q12, a gear shifting determination on whether the gear stage is shifted is made on the basis of the current drive power and the current vehicle speed V by using the common upshift line to any of the downshift lines that are the gear shifting lines 1 to 4 set in accordance with the travel mode in above Q8 to Q11. More specifically, when the drive power or the vehicle speed V is changed in a manner to cross the downshift line or the upshift line, a gear shifting execution determination is made to set the new target gear stage Gtag. If the gear stage does not have to be shifted, a series of gear shifting determination processing is terminated as is.

Figure 7:
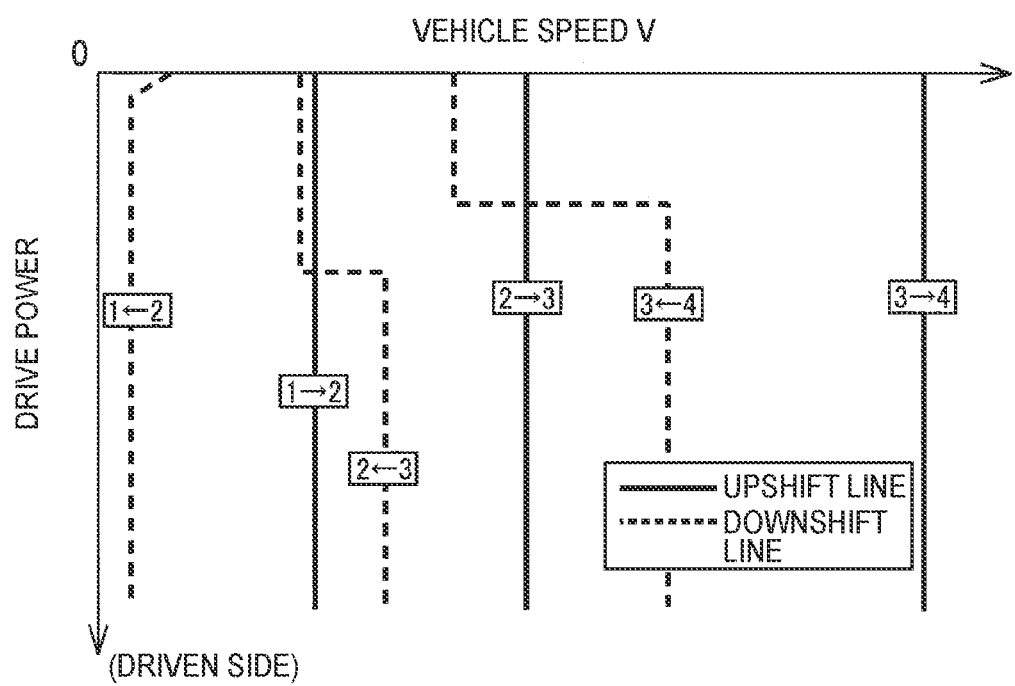
FIG. 7 is a chart that illustrates one example of the gear shifting map during driven travel.

Note that, in the case where a manual (M) transmission mode in which the driver can shift the gear stage of the automatic transmission 16 by a manual operation is selected, the target gear stage Gtag is upshifted or downshifted in accordance with an up/down signal supplied from an up/down switch, which is not shown, or the like. In addition, during driven travel (during braking travel) during which the target drive power Ftag2 becomes negative (minus) and is input from the drive wheels 36 side on a downhill, during deceleration, or the like, the target gear stage Gtag of the automatic transmission 16 is set in accordance with a gear shifting map shown in FIG. 7. The hystereses are also provided between the upshift lines and the downshift lines as the gear shifting condition in the gear shifting map during this driven travel.

The gear shifting restriction section 68 prohibits gear shifting under a certain condition when the gear shifting execution determination for gear shifting is made in above Q12. The gear shifting restriction section 68 executes the signal processing in accordance with steps R1 to R13 (hereinafter simply referred to as R1 to R13) of a flowchart in FIG. 8, for example. This gear shifting restriction section 68 corresponds to the gear shifting suppression section.

Figure 8:
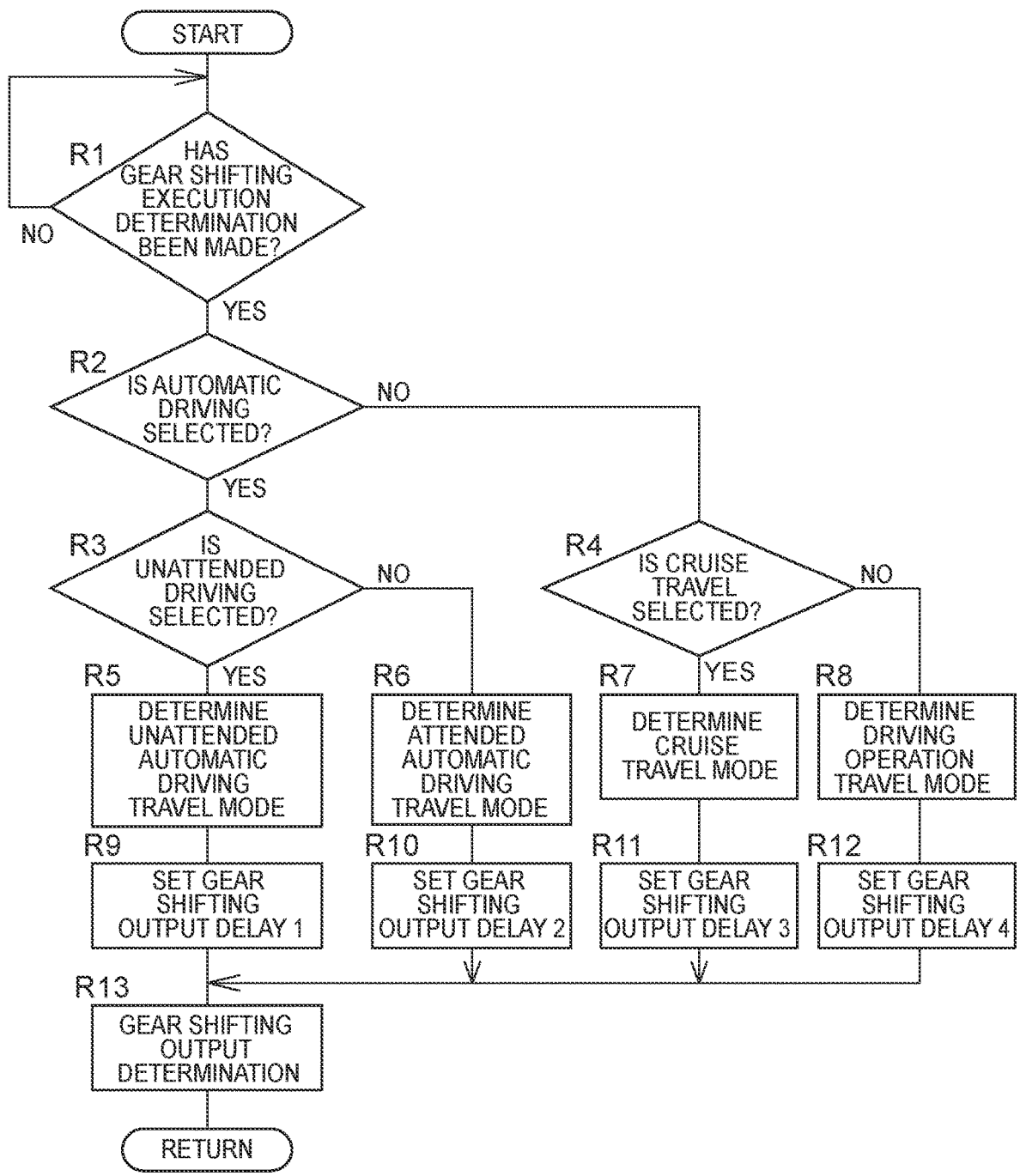
FIG. 8 is a flowchart that specifically illustrates contents of signal processing executed by a gear shifting restriction section of the stepped gear shifting control section in FIG. 1.

In R1 of FIG. 8, it is determined whether the gear shifting execution determination for gear shifting has been made in above Q12. If the gear shifting execution determination has been made, R2 onward are executed. Similar to Q1 to Q7 in FIG. 5, the travel modes are determined in R2 to R8. Determination results of Q4 to Q7 may be read. Then, if it is determined in R5 that the unattended automatic driving travel mode is selected, a gear shifting output delay 1 is set in R9. If it is determines in R6 that the attended automatic driving travel mode is selected, a gear shifting output delay 2 is set in R10. If it is determined in R7 that the cruise travel mode is selected, a gear shifting output delay 3 is set in R11. If it is determined in R8 that the driving operation travel mode is selected, a gear shifting output delay 4 is set in R12. Each of the gear shifting output delays 1 to 4 defines a delay time until a gear shifting command for shifting to the target gear stage Gtag is actually output after the gear shifting execution determination is made. As the delay time is extended, frequent gear shifting is suppressed; however, drive power responsiveness is possibly degraded. In other words, when the gear shifting execution determination is canceled during the delay time, gear shifting is no longer required, and frequent gear shifting is prevented. However, when the gear shifting execution determination continues, gear shifting is delayed for the delay time, and thus the drive power responsiveness is degraded. Accordingly, in order to allow harmonization of frequent gear shifting with the drive power responsiveness, in this embodiment, the delay times are set to satisfy a relationship of the gear shifting output delay 1<the gear shifting output delay 4<the gear shifting output delay 3<the gear shifting output delay 2. In this embodiment, the gear shifting output delays 1 to 4 are applied to both of upshifting and downshifting. However, the gear shifting output delays 1 to 4 may only be applied to downshifting or may only be applied to upshifting. When the gear shifting output delays 1 to 4 are only applied to downshifting, upshifting is promptly performed by following the gear shifting execution determination, and thus the fuel economy is improved.

Figure 9:
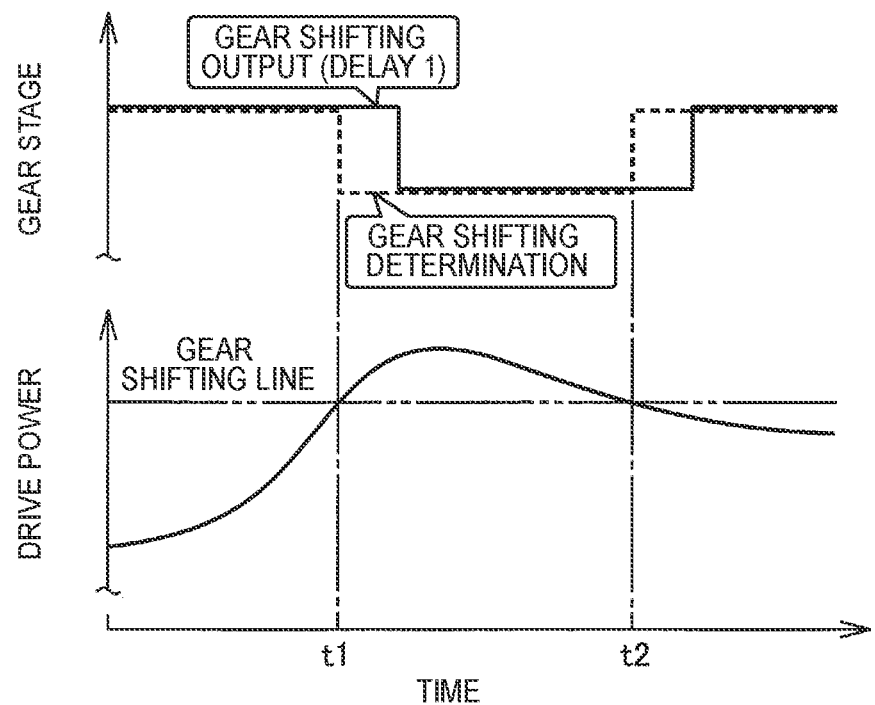
FIG. 9 is one example of a time chart that specifically illustrates a gear shifting output delay 1 set in step R9 of FIG. 8.
Figure 10:
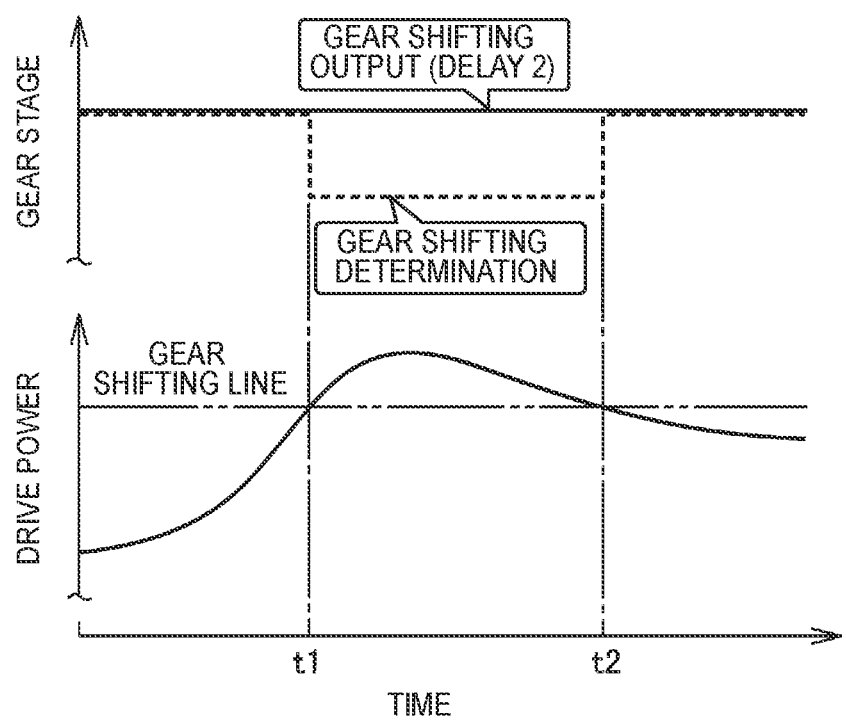
FIG. 10 is one example of a time chart that specifically illustrates a gear shifting output delay 2 set in step R10 of FIG. 8.

In the unattended automatic driving travel mode, the occupant is absent, and there is no need to consider the degradation of the ride quality caused by frequent gear shifting. Accordingly, the delay time of the gear shifting output delay 1 can be shortened, and the delay time can also be set to zero (none). In the attended automatic driving travel mode, the occupant is present in a state of not monitoring the vehicle speed and the acceleration. Accordingly, his/her sensitivity to the degradation of the ride quality caused by frequent gear shifting is the highest, and the delay time of the gear shifting output delay 2 is the longest of the gear shifting output delays 1 to 4. In the cruise travel mode, the occupant is present in a state of monitoring the vehicle speed and the acceleration. However, because the driver does not perform the acceleration/deceleration operation, his/her sensitivity to the degradation of the ride quality caused by frequent gear shifting is higher than that in the driving operation travel mode. Accordingly, the gear shifting output delay 3 is set to be the second longest delay time after that in the attended automatic driving travel mode. In the driving operation travel mode, because the driver himself/herself makes the acceleration/deceleration request in real time, the superior drive power responsiveness is desired. Accordingly, the delay time of the gear shifting output delay 4 is set to be shorter than the delay time in the cruise travel mode. FIG. 9 is one example of a time chart that shows a relationship between the gear shifting determination (a broken line) and gear shifting output (a solid line) during the unattended automatic driving travel mode. The delay time by the gear shifting output delay 1 is short, and downshifting or upshifting is promptly performed in response to the change in the drive power. FIG. 10 is one example of a time chart that shows a relationship between the gear shifting determination (a broken line) and the gear shifting output (a solid line) during the attended automatic driving travel mode. The delay time by the gear shifting output delay 2 is the longest. During the delay time, the drive power is decreased, and a downshifting execution determination is canceled. Accordingly, downshifting is no longer required, and frequent gear shifting is prevented. These gear shifting lines in FIG. 9 and FIG. 10 each serve as the downshift line and the upshift line, and the hysteresis is not provided. In these FIG. 9 and FIG. 10, time t1 is time at which the downshifting execution determination is made, and time t2 is time at which an upshifting execution determination is made. Note that the delay times of the gear shifting output delays 1 and 4 in the unattended automatic driving travel mode and the driving operation travel mode may be set to be the same, and the delay times of the gear shifting output delays 2 and 3 in the attended automatic driving travel mode and the cruise travel mode may be set to be the same.

In R13, it is determined whether an output condition of the gear shifting command by each of the gear shifting output delays 1 to 4, which are set in above R9 to R12 per travel mode, is satisfied, that is, whether the gear shifting execution determination to the target gear stage Gtag continues even after a lapse of the delay time. Then, if the gear shifting execution determination continues, the gear shifting command for shifting to the target gear stage Gtag is output, and the engaged/disengaged states of the clutches C and the brakes B are switched. In this way, the gear stage of the automatic transmission 16 is changed to the target gear stage Gtag. In the case where the gear shifting execution determination is canceled before the lapse of the delay time, the gear shifting command is not output, and a series of gear shifting restriction processing is terminated.

Figure 11:
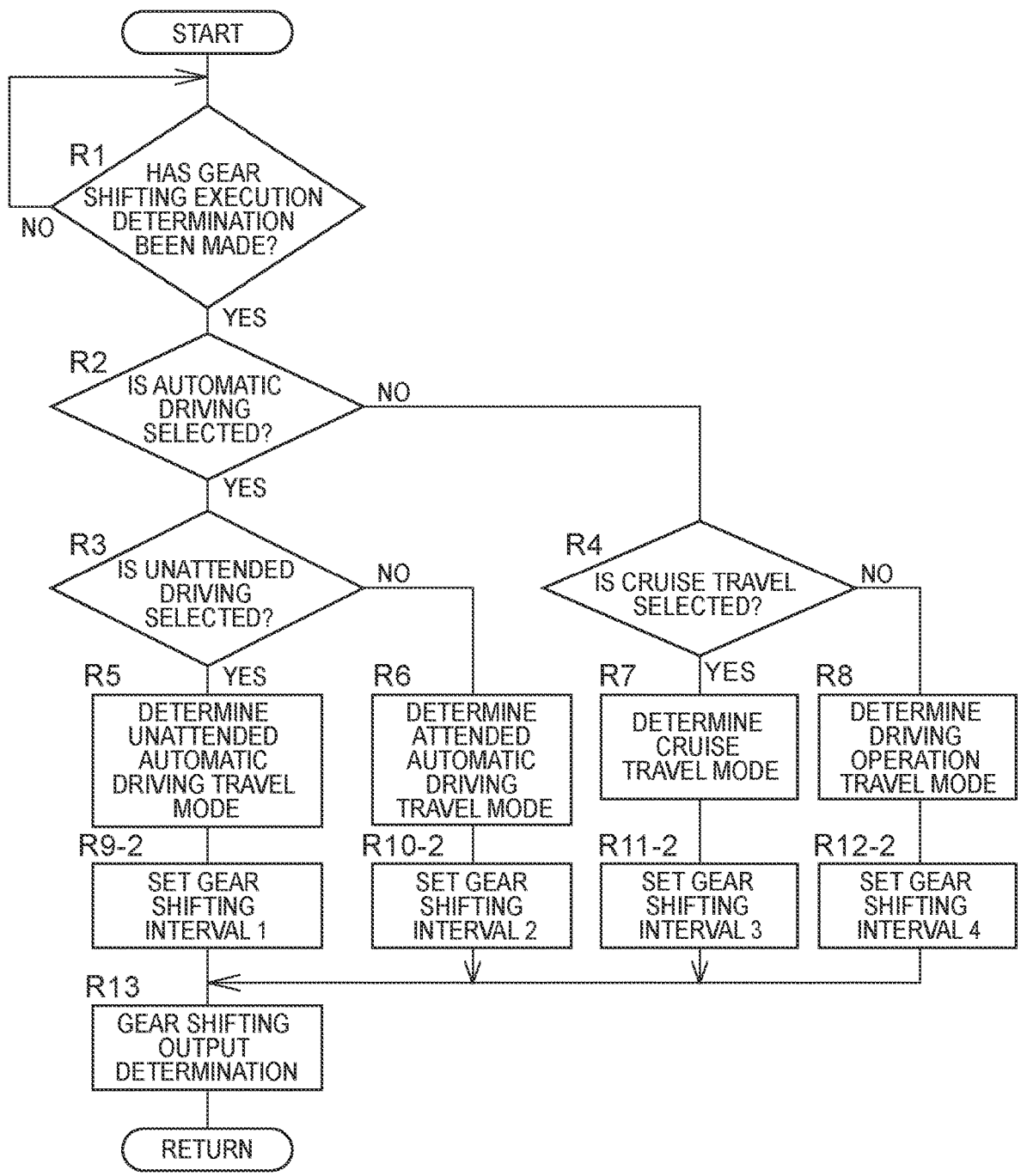
FIG. 11 is a flowchart that illustrates another example of the signal processing executed by the gear shifting restriction section of the stepped gear shifting control section in FIG. 1.

FIG. 11 is a flowchart that illustrates another aspect of the gear shifting restriction section 68 and differs from the flowchart in FIG. 8 in a point that R9-2 to R12-2 are provided instead of R9 to R12. More specifically, if it is determined in R5 that the unattended automatic driving travel mode is selected, a gear shifting interval 1 is set in R9-2. If it is determined in R6 that the attended automatic driving travel mode is selected, a gear shifting interval 2 is set in R10-2. If it is determined in R7 that the cruise travel mode is selected, a gear shifting interval 3 is set in R11-2. If it is determined in R8 that the driving operation travel mode is selected, a gear shifting interval 4 is set in R12-2. The gear shifting intervals 1 to 4 correspond to the number n of the gear shifting execution determination until the gear shifting command for shifting to the target gear stage Gtag is actually output in the case where the gear shifting execution determination is repeatedly made without exceeding a predetermined standby time. As the determination number n is increased, frequent gear shifting is suppressed; however, the fuel economy is possibly degraded. That is, in the case where the gear shifting execution determination is canceled before reaching the determination number n, gear shifting is no longer required, and frequent gear shifting is prevented. Meanwhile, in the case where the gear shifting execution determination is repeatedly made, gear shifting is delayed for the determination number n, the duration of the travel at the optimum gear stage is shortened, and thus the fuel economy is degraded. Accordingly, in order to allow harmonization of frequent gear shifting with the fuel economy, in this embodiment, the determination number n is set to satisfy a relationship of the gear shifting interval 1=the gear shifting interval 4<the gear shifting interval 3<the gear shifting interval 2. In this embodiment, the determination number n is applied to both of upshifting and downshifting. However, the determination number n may only be applied to downshifting or may only be applied to upshifting. When the determination number n is only applied to downshifting, upshifting is immediately performed by following the first gear shifting execution determination, and thus the fuel economy is improved.

Figure 12:
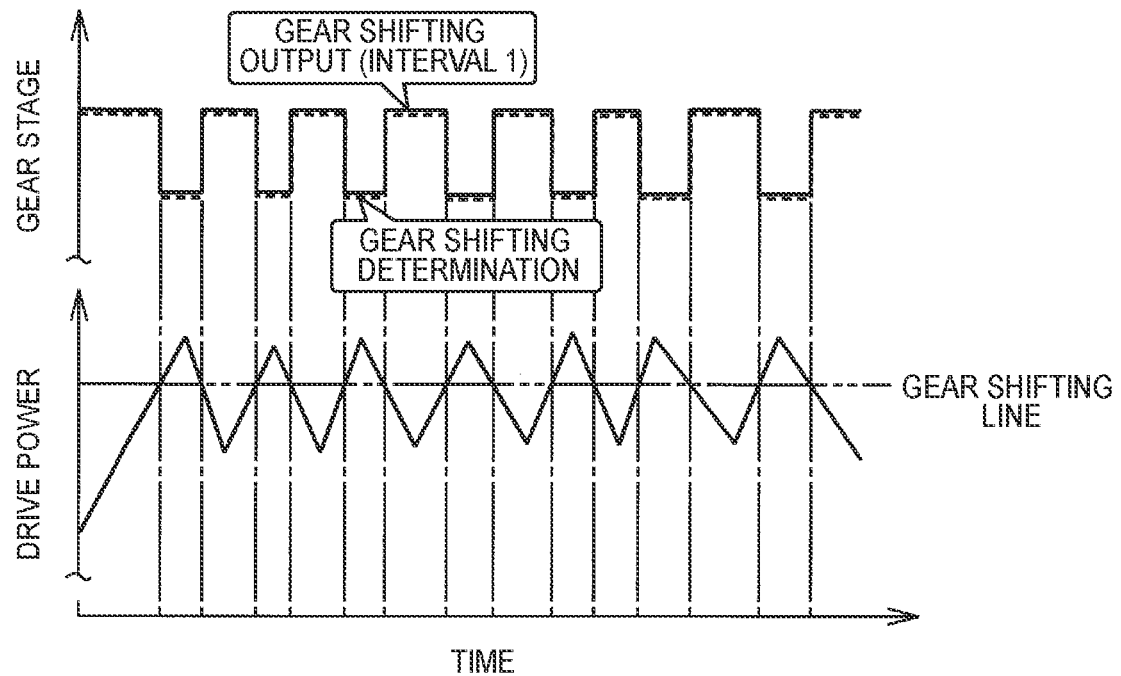
FIG. 12 is one example of a time chart that specifically illustrates a gear shifting output interval 1 set in step R9-2 of FIG. 11.
Figure 13:
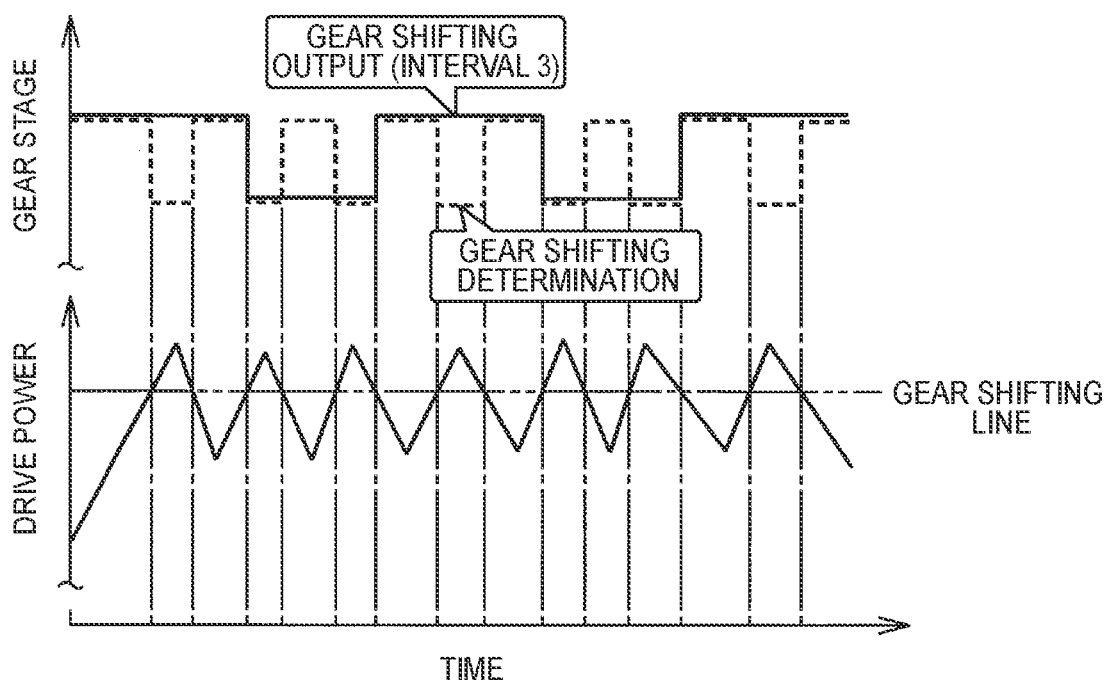
FIG. 13 is one example of a time chart that specifically illustrates a gear shifting output interval 3 set in step R11-2 of FIG. 11.

In the unattended automatic driving travel mode, the occupant is absent, and there is no need to consider the degradation of the ride quality caused by frequent gear shifting. Accordingly, the determination number n in the gear shifting interval 1 can be decreased. In this embodiment, the determination number n=0, and the gear shifting command is immediately output in response to the first gear shifting execution determination. In the attended automatic driving travel mode, the occupant is present in the state of not monitoring the vehicle speed and the acceleration. Accordingly, his/her sensitivity to the degradation of the ride quality caused by frequent gear shifting is the highest, and the determination number n in the gear shifting interval 2 is the largest. In the cruise travel mode, the occupant is present in the state of monitoring the vehicle speed and the acceleration. However, because the driver does not perform the acceleration/deceleration operation, his/her sensitivity to the degradation of the ride quality caused by frequent gear shifting is higher than that in the driving operation travel mode. Accordingly, the gear shifting interval 3 is set to have the second largest determination number n after that in the attended automatic driving travel mode. In the driving operation travel mode, because the driver himself/herself makes the acceleration/deceleration request in real time, his/her sensitivity to the degradation of the ride quality caused by frequent gear shifting is low. Accordingly, the determination number n in the gear shifting interval 4 can be made smaller than that in the cruise travel mode. In this embodiment, similar to the gear shifting interval 1, the determination number n=0, and the gear shifting command is immediately output in response to the first gear shifting execution determination. FIG. 12 is one example of a time chart that shows a relationship between the gear shifting execution determination (a broken line) and the gear shifting output (a solid line) during the unattended automatic driving travel mode and during the driving operation travel mode. Because the determination number n in each of the gear shifting intervals 1 and 4 is 0, the gear shifting command is immediately output in response to the gear shifting execution determination, and downshifting and upshifting are repeatedly performed. FIG. 13 is one example of a time chart that shows a relationship between the gear shifting execution determination (a broken line) and the gear shifting output (a solid line) during the cruise travel mode and shows a case where the determination number n in the gear shifting interval 3 is 2. When the number of the gear shifting execution determination for downshifting or upshifting becomes 2, the gear shifting command is output, and downshifting or upshifting is performed. When compared to the case of the determination number n=0 as shown in FIG. 12, the number of frequent gear shifting is suppressed to be a half. These gear shifting lines in FIG. 12 and FIG. 13 each serve as the downshift line and the upshift line, and the hysteresis is not provided. Note that the number of the gear shifting execution determination in the gear shifting intervals 2 and 3 in the attended automatic driving travel mode and the cruise travel mode may be set to be the same.

In R13, it is determined whether the output condition of the gear shifting command by each of the gear shifting intervals 1 to 4, which are set in above R9-2 to R12-2 per travel mode, is satisfied, that is, whether the number of the gear shifting execution determination for shifting to the target gear stage Gtag has reached the determination number n. If the number of the gear shifting execution determination has reached the determination number n, the gear shifting command for shifting to the target gear stage Gtag is output, and the engaged/disengaged states of the clutches C and the brakes B are switched. In this way, the gear stage of the automatic transmission 16 is changed to the target gear stage Gtag. In the case where the gear shifting execution determination is canceled before the number thereof reaches the determination number n, the gear shifting command is not output, and a series of the gear shifting restriction processing is terminated.

Figure 14:
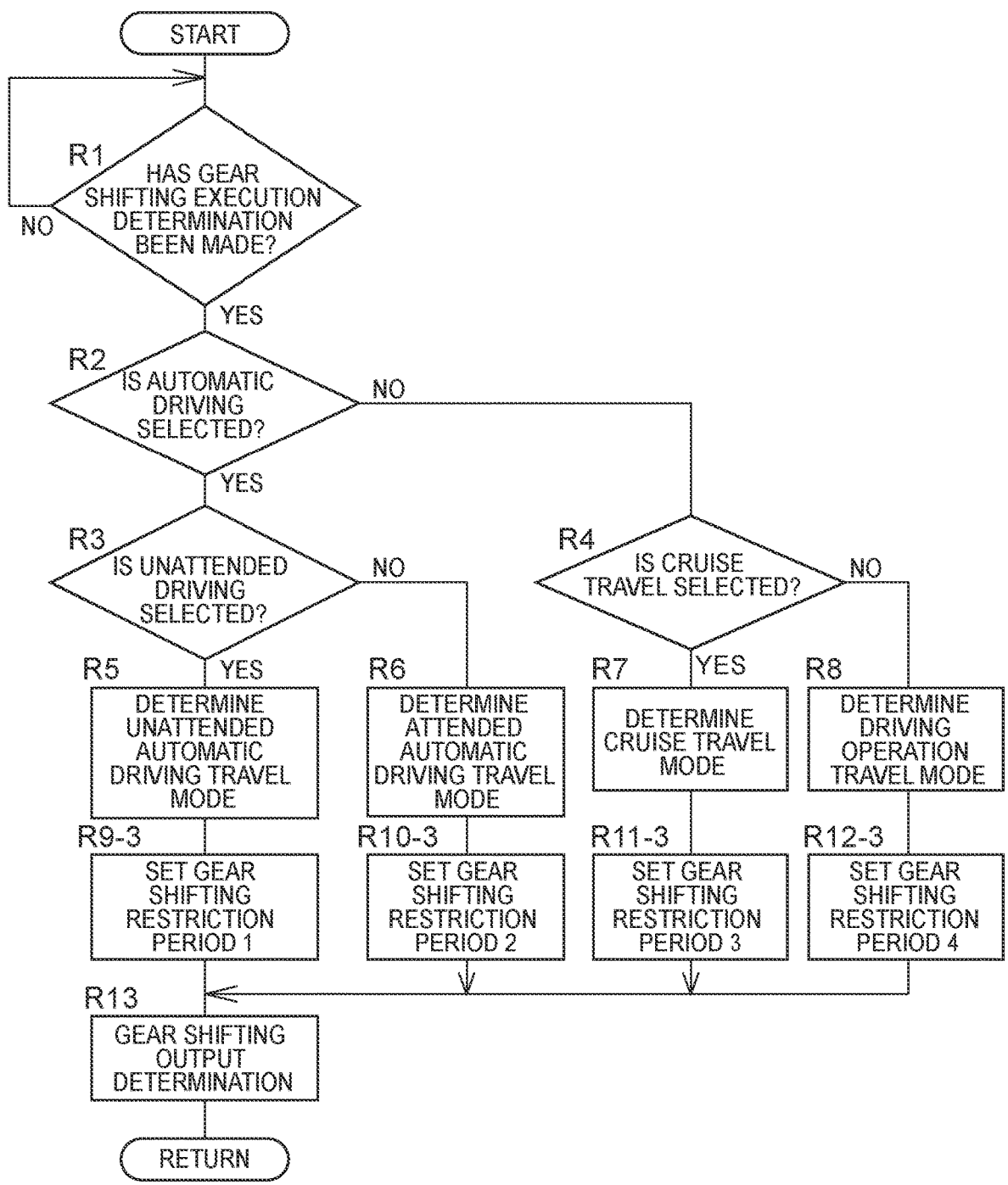
FIG. 14 is a flowchart that illustrates yet another example of the signal processing executed by the gear shifting restriction section of the stepped gear shifting control section in FIG. 1.

FIG. 14 is a flowchart that illustrates yet another aspect of the gear shifting restriction section 68 and differs from the flowchart in FIG. 8 in a point that R9-3 to R12-3 are provided instead of R9 to R12. More specifically, if it is determined in R5 that the unattended automatic driving travel mode is selected, a gear shifting restriction period 1 is set in R9-3. If it is determined in R6 that the attended automatic driving travel mode is selected, a gear shifting restriction period 2 is set in R10-3. If it is determined in R7 that the cruise travel mode is selected, a gear shifting restriction period 3 is set in R11-3. If it is determined in R8 that the driving operation travel mode is selected, a gear shifting restriction period 4 is set in R12-3. Each of the gear shifting restriction periods 1 to 4 is a period in which gear shifting is prohibited from being continuously made after gear shifting. The gear shifting execution determination is canceled until each of the gear shifting restriction periods 1 to 4 elapses after the last gear shifting. After a lapse of each of the gear shifting restriction periods 1 to 4, gear shifting to the target gear stage Gtag in response to the gear shifting execution determination is permitted. Accordingly, as this gear shifting restriction period is extended, frequent gear shifting is suppressed; however, the duration of the travel at the optimum gear stage is shortened, and thus the fuel economy is possibly degraded. Thus, in order to allow the harmonization of frequent gear shifting with the fuel economy, in this embodiment, the gear shifting restriction periods 1 to 4 are set to satisfy a relationship of the gear shifting restriction period 1<the gear shifting restriction period 4<the gear shifting restriction period 3<the gear shifting restriction period 2. In this embodiment, the gear shifting restriction periods 1 to 4 are applied to both of upshifting and downshifting. However, the gear shifting restriction periods 1 to 4 may only be applied to downshifting or may only be applied to upshifting. When the gear shifting restriction periods 1 to 4 are only applied to downshifting, upshifting is promptly performed by following the gear shifting execution determination, and thus the fuel economy is improved.

In the unattended automatic driving travel mode, the occupant is absent, and there is no need to consider the degradation of the ride quality caused by frequent gear shifting. Accordingly, the gear shifting restriction period 1 can be shortened, and the gear shifting restriction period 1 can also be set to zero (none). In the attended automatic driving travel mode, the occupant is present in the state of not monitoring the vehicle speed and the acceleration. Accordingly, his/her sensitivity to the degradation of the ride quality caused by frequent gear shifting is the highest, and the gear shifting restriction period 2 is the longest of the gear shifting restriction periods 1 to 4. In the cruise travel mode, the occupant is present in the state of monitoring the vehicle speed and the acceleration. However, because the driver does not perform the acceleration/deceleration operation, his/her sensitivity to the degradation of the ride quality caused by frequent gear shifting is higher than that in the driving operation travel mode. Accordingly, the gear shifting restriction period 3 is set to be the second longest period after that in the attended automatic driving travel mode. In the driving operation travel mode, because the driver himself/herself makes the acceleration/deceleration request in real time, his/her sensitivity to the degradation of the ride quality caused by frequent gear shifting is low. Accordingly, the gear shifting restriction period 4 is set to be shorter than that in cruise travel mode. Note that the gear shifting restriction periods 1 and 4 in the unattended automatic driving travel mode and the driving operation travel mode may be set to be the same time, and the gear shifting restriction periods 2 and 3 in the attended automatic driving travel mode and the cruise travel mode may be set to be the same time.

In R13, it is determined whether the output condition of the gear shifting command by each of the gear shifting restriction periods 1 to 4, which are set in above R9-3 to R12-3 per travel mode, is satisfied, that is, whether a time that has elapsed since the last gear shifting exceeds each of the gear shifting restriction periods 1 to 4. If the time that has elapsed since the last gear shifting exceeds each of the gear shifting restriction periods 1 to 4, the gear shifting command for shifting to the target gear stage Gtag is output, and the engaged/disengaged states of the clutches C and the brakes B are switched. In this way, the gear stage of the automatic transmission 16 is changed to the target gear stage Gtag. If the time that has elapsed since the last gear shifting does not exceed each of the gear shifting restriction periods 1 to 4, the gear shifting execution determination is canceled, the gear shifting command is not output, and a series of the gear shifting restriction processing is terminated.

Here, the gear shifting restriction by the gear shifting restriction periods 1 to 4, which are set in R9-3 to R12-3 of above FIG. 14, can also be implemented in combination with the gear shifting restriction by the gear shifting output delays 1 to 4, which are set in R9 to R12 of FIG. 8, or the gear shifting restriction by the gear shifting intervals 1 to 4, which are set in R9-2 to R12-2 of FIG. 11. In addition, in regard to the gear shifting map on the driven side shown in FIG. 7, the gear shifting map in which the amount of the hysteresis differs by the travel mode may be set, and the gear shifting restriction by the delay time of the gear shifting output, the gear shifting interval, or the gear shifting restriction period can be executed. Those delay time, gear shifting interval, and gear shifting restriction period can also be set per travel mode.

Figure 15:
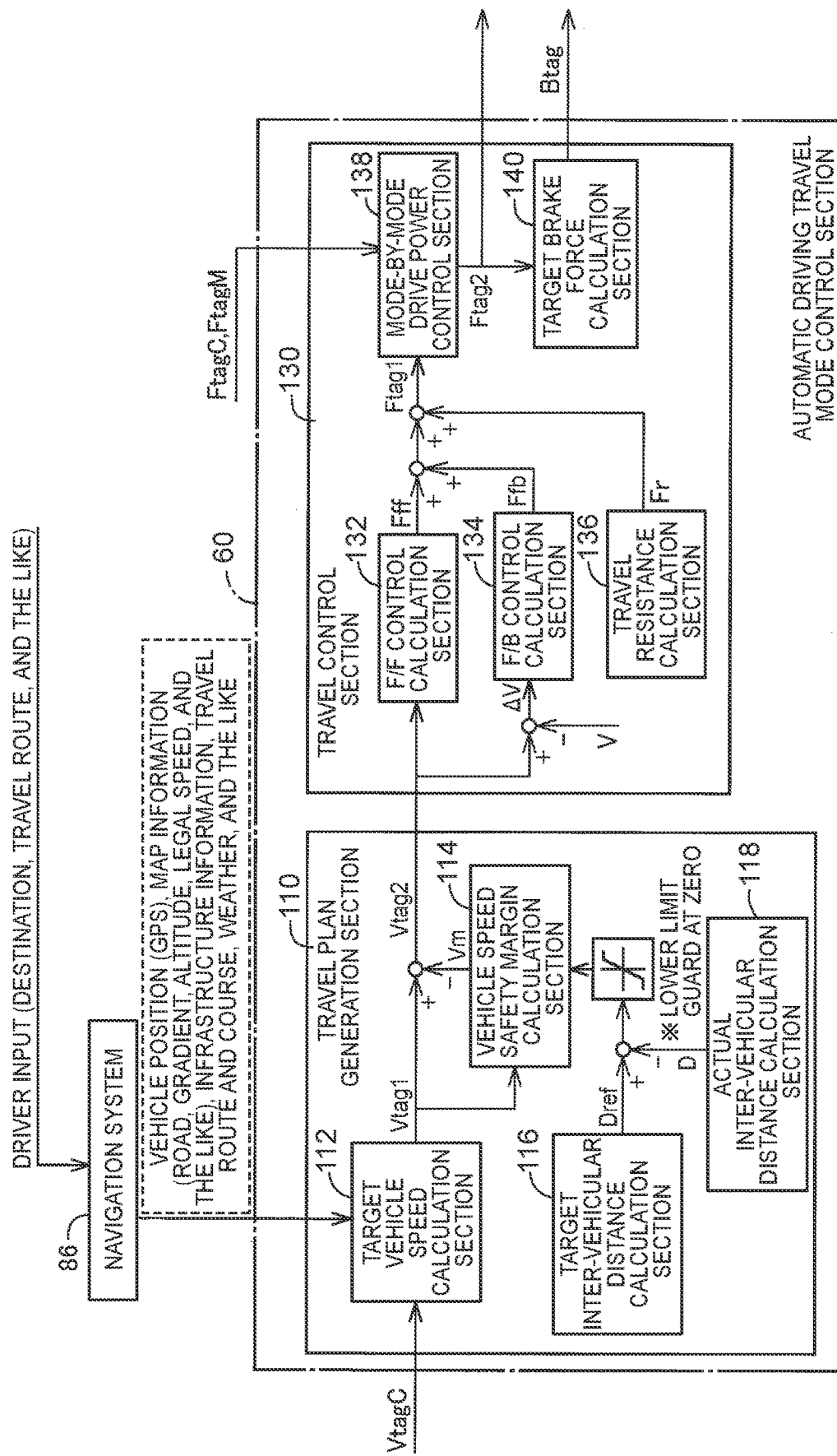
FIG. 15 is a block diagram that specifically illustrates functions related to a drive system executed by an automatic driving travel mode control section in FIG. 1.

Returning to FIG. 1, when the attended or unattended automatic driving travel mode is selected, the steering control section 56 controls the automatic steering system 46 to obtain a target steering angle Φtag supplied from the automatic driving travel mode control section 60. This target steering angle Φtag is appropriately set in accordance with the vehicle speed V, the drive power, and the like such that the vehicle travels along the predetermined travel route, travels along the lane or the like or switches the lane detected by the camera 90, is parked in the garage or parallel-parked on the basis of parking position information detected by the camera 90, or avoids contact with the pedestrian or the obstacle detected by the radar 88 or the camera 90. FIG. 15 illustrates a function of a drive system of the automatic driving travel mode control section 60 and does not show the steering control.

When the attended or unattended automatic driving travel mode is selected, the brake control section 58 controls the automatic brake system 44 such that each of the wheel brakes 38 is actuated with a target brake force Btag supplied from the automatic driving travel mode control section 60. This target brake force Btag is appropriately set such that the vehicle decelerates at specified deceleration by a target inter-vehicular distance calculation section 116, an actual inter-vehicular distance calculation section 118, a vehicle speed safety margin calculation section 114, a target brake force calculation section 140, and the like shown in FIG. 15 in order to stop at a predetermined stop position, to stop in accordance with the signal information (a red light) detected by the camera 90 or input from the outside, to secure the inter-vehicular distance from the preceding vehicle detected by the radar 88, or to avoid a collision with the pedestrian or the obstacle detected by the radar 88 or the camera 90. Not only in the automatic driving travel mode, but also in the cruise travel mode, in which the constant speed travel or the following travel is made, and the driving operation travel mode, in which the drive power is controlled in accordance with the acceleration/deceleration operation by the driver, the target brake force Btag is set under a certain condition such as avoidance of the collision. In this way, the wheel brakes 38 can forcibly be actuated.

As shown in FIG. 15, the automatic driving travel mode control section 60 functionally includes a travel plan generation section 110 and a travel control section 130 for the drive system. The travel plan generation section 110 includes the target vehicle speed calculation section 112, the vehicle speed safety margin calculation section 114, the target inter-vehicular distance calculation section 116, and the actual inter-vehicular distance calculation section 118. The target vehicle speed calculation section 112 is supplied with vehicle position information, the map information that includes the road, the gradient, the altitude, the legal speed, and the like, infrastructure information, and information that includes the travel route, a course, weather, and the like from the navigation system 86. In the navigation system 86, the destination, the travel route, and the like are set by the driver, and cooperative driving in which the operation by the driver is added to automatic driving, a high priority on time, a high priority on the fuel economy, an upper limit vehicle speed, a desired vehicle speed, and the like can be set. The infrastructure information is information that is supplied from the information communication equipment provided on the road, in the signal, or the like. The target vehicle speed calculation section 112 successively sets a target vehicle speed Vtag1 on the basis of these types of the information, and the target vehicle speed Vtag1 serves as a base during automatic driving. This target vehicle speed calculation section 112 is supplied with the target vehicle speed VtagC during the constant speed travel from the cruise travel mode control section 62, and sets the target vehicle speed VtagC to the target vehicle speed Vtag1 in the cruise travel mode.

The vehicle speed safety margin calculation section 114 calculates a vehicle speed safety margin Vm in accordance with a difference between a target inter-vehicular distance Dref that is defined by the target inter-vehicular distance calculation section 116 and the actual inter-vehicular distance D that is computed on the basis of the signal and the like from the radar 88 by the actual inter-vehicular distance calculation section 118. A target vehicle speed Vtag2 is computed by subtracting the vehicle speed safety margin Vm from the target vehicle speed Vtag1. Each of the target inter-vehicular distance Dref and the actual inter-vehicular distance D is the inter-vehicular distance from the preceding vehicle, and a distance that is long enough for the vehicle to be able to avoid a collision with the preceding vehicle is set as the target inter-vehicular distance Dref in accordance with the current vehicle speed V and the like. When the actual inter-vehicular distance D is longer than the target inter-vehicular distance Dref, in order to avoid an unnecessary increase in the vehicle speed V, the vehicle speed V is subjected to a lower limit guard with the vehicle speed safety margin Vm=0. Note that the vehicle speed safety margin Vm may be calculated not only on the basis of the distance from the preceding vehicle but also on the basis of distances from the pedestrian, the obstacle, and a vehicle on a side that is predicted to move to a position in front of the vehicle.

The travel control section 130 includes the feed-forward (F/F) control calculation section 132, the feedback (F/B) control calculation section 134, a travel resistance calculation section 136, the mode-by-mode drive power control section 138, and the target brake force calculation section 140. The F/F control calculation section 132 computes an FF drive power value Fff, which is required for the travel at the target vehicle speed Vtag2, by a predetermined feed-forward control equation and the like. The F/B control calculation section 134 computes an FB correction value Ffb by a predetermined feedback control equation and the like on the basis of a deviation ΔV between the target vehicle speed Vtag2 and the current vehicle speed V. In addition, the travel resistance calculation section 136 computes travel resistance Fr on the basis of a vehicle road load (R/L), vehicle weight (the number of the occupants, and the like), the road gradient, and the like. Then, the travel resistance calculation section 136 computes a target drive power Ftag1 as a basis by adding the FF drive power value Fff, the FB correction value Ffb, and the travel resistance Fr described above. The road load may be set in the navigation system 86 or the like in advance. However, the road load can also be downloaded via a communication line or can be computed from actual drive power F, the road gradient, the vehicle speed V, and the like.

The mode-by-mode drive power control section 138 corrects the target drive power Ftag1 as the basis in accordance with the travel mode and executes the signal processing in accordance with steps S1 to S12 (hereinafter simply referred to as S1 to S12) of a flowchart in FIG. 16, for example. This mode-by-mode drive power control section 138 is supplied with the target drive power FtagC from the cruise travel mode control section 62, and is also supplied with the target drive power FtagM, which is computed on the basis of the accelerator operation amount Acc, the vehicle speed V, and the like, from the driving operation travel mode control section 64. The target drive power FtagC is computed such that the vehicle makes the following travel while keeping the target inter-vehicular distance DtagC. During the cruise travel mode and during the driving operation travel mode, those target drive power FtagC, FtagM are set to the target drive power Ftag1 as the basis.

Figure 16:
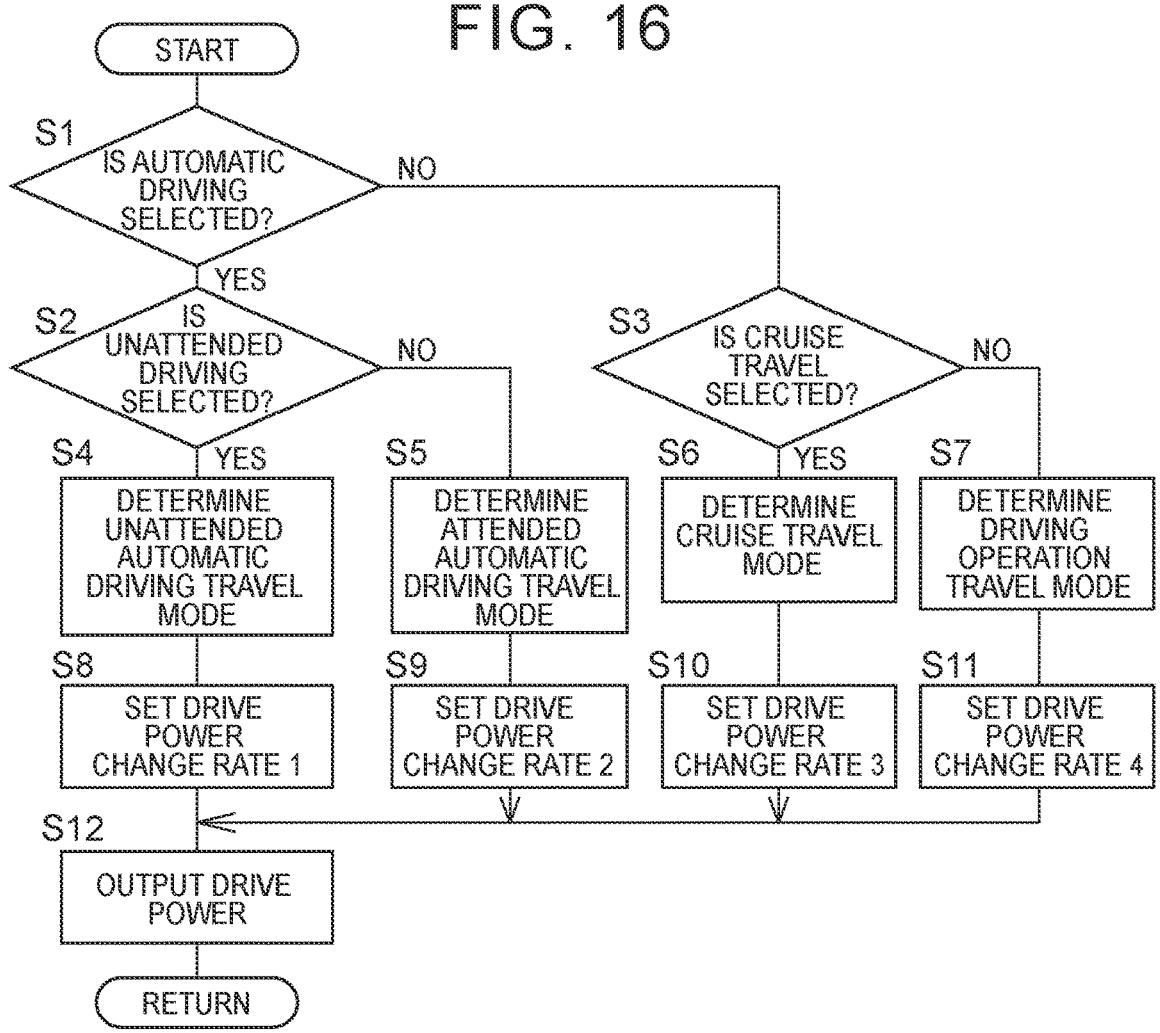
FIG. 16 is a flowchart that specifically illustrates contents of signal processing executed by a mode-by-mode drive power control section in FIG. 15.

In S1 to S7 in FIG. 16, similar to Q1 to Q7 in FIG. 5, the travel modes are determined. The determination results of Q4 to Q7 may be read. If it is determined in S4 that the unattended automatic driving travel mode is selected, a drive power change rate 1 is set in S8. If it is determined in S5 that the attended automatic driving travel mode is selected, a drive power change rate 2 is set in S9. If it is determined in S6 that the cruise travel mode is selected, a drive power change rate 3 is set in S10. If it is determined in S7 that the driving operation travel mode is selected, a drive power change rate 4 is set in S11. These drive power change rates 1 to 4 are each set to decrease a change at a time when the target drive power Ftag2 is increased. As a result, not only the change in the drive power is alleviated, but also downshifting by the stepped gear shifting control section 54 is suppressed. Thus, this mode-by-mode drive power control section 138 also functions as the gear shifting suppression section.

Figure 17:
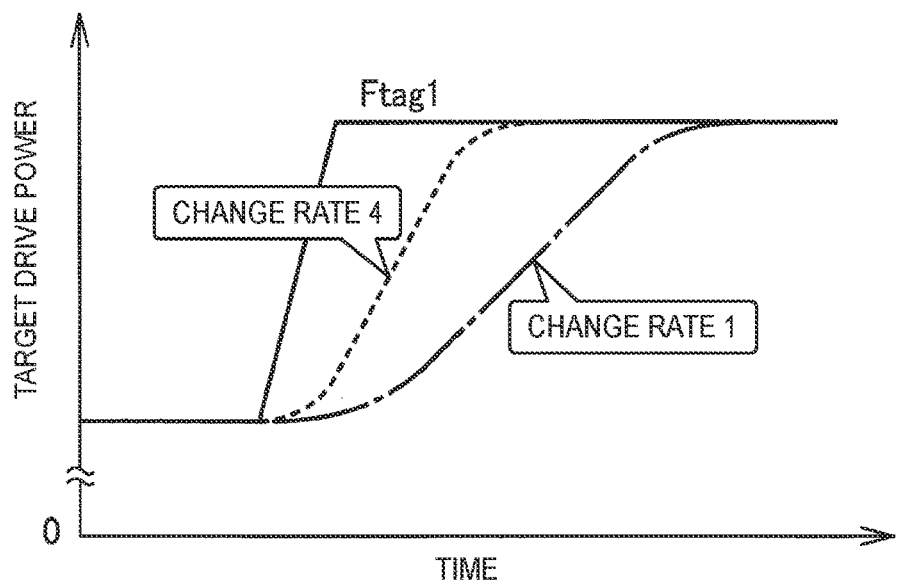
FIG. 17 is one example of a time chart that illustrates a change rate 1 and a change rate 4 of drive power set in steps S8, S11 of FIG. 16.

The above drive power change rates 1 to 4 each define a maximum value of a change rate (a change ratio) of the target drive power Ftag2. As contribution of the drive power responsiveness (response) to the driving operation by the driver is decreased, the drive power responsiveness (response) to the acceleration request is less requested. Accordingly, in order to allow the harmonization of the fuel economy with the drive power responsiveness, in this embodiment, the drive power change rates 1 to 4 are set to satisfy a relationship of the drive power change rate 1<the drive power change rate 2<the drive power change rate 3<the drive power change rate 4. The drive power change rates 1 to 4 each have a positive value and restrict an increase amount of the target drive power Ftag2 when the target drive power Ftag2 is increased. Here, in the unattended automatic driving travel mode, the occupant is absent, and the drive power responsiveness to the acceleration request is least requested. Thus, the drive power change rate 1 may be the lowest of the drive power change rates 1 to 4 in consideration of the fuel economy. In the attended automatic driving travel mode, the occupant is present in the state of not monitoring the vehicle speed and the acceleration. Accordingly, the drive power responsiveness is not significantly required. Thus, the drive power change rate 2 may be low in consideration of the fuel economy, the ride quality, frequent gear shifting, and the like. In the cruise travel mode, the occupant is present in the state of monitoring the vehicle speed and the acceleration. However, because the driver does not perform the acceleration/deceleration operation, the drive power change rate 3 may be higher than that in the automatic driving travel mode but may be lower than that in the driving operation travel mode in which the driver performs the acceleration/deceleration operation. In the driving operation travel mode, because the driver himself/herself makes the acceleration/deceleration request in real time, the superior drive power responsiveness is desired, and room to restrict the drive power change rate 4 is restricted. FIG. 17 is a time chart that exemplifies a case where a change in the target drive power Ftag1 as the basis is restricted by the change rate 1 and the change rate 4. These change rates 1 to 4 may each have a constant value (a fixed value) but may be changed in accordance with the driving condition of the vehicle such as the vehicle speed, the operation condition of the driver, or the like during starting or the kickdown, for example. Note that the change rate 4 in the driving operation travel mode can also be unrestricted. In addition, the change rates 1 to 3 may be set to be the same rate.

In S12, the change in the target drive power Ftag1 as the basis is restricted on the basis of the change rates 1 to 4, which are set in above S8 to S11 per travel mode, when necessary (smoothing processing). In this way, the final target drive power Ftag2 is computed. Then, the target drive power Ftag2 is output to the target brake force calculation section 140 and is also output to the hybrid control section 52 and the stepped gear shifting control section 54.

Figure 18:
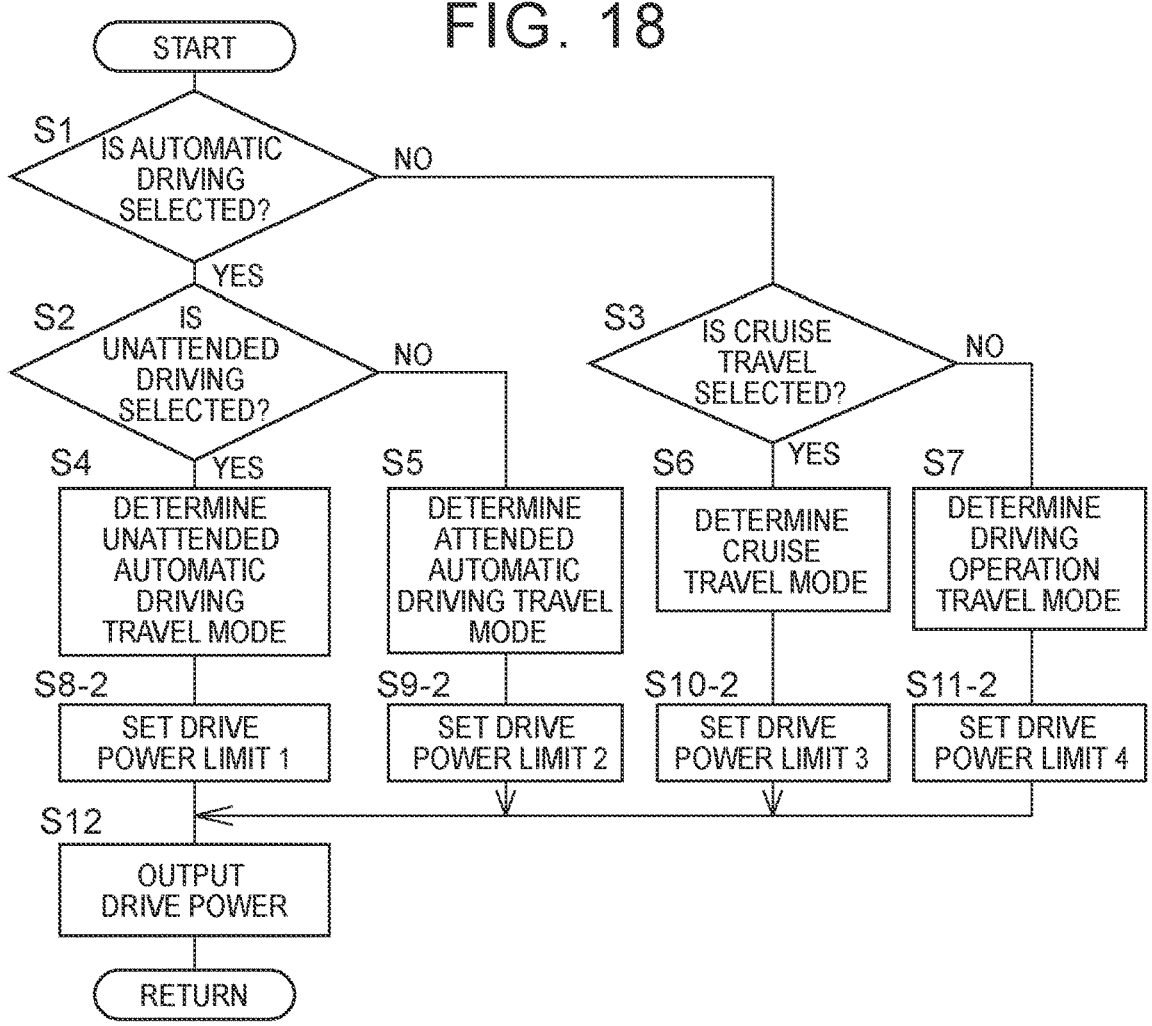
FIG. 18 is a flowchart that illustrates another example of the signal processing executed by the mode-by-mode drive power control section in FIG. 15.

FIG. 18 is a flowchart that illustrates another aspect of the mode-by-mode drive power control section 138 and differs from the flowchart in FIG. 16 in a point that S8-2 to S11-2 are provided instead of S8 to S11. More specifically, if it is determined in S4 that the unattended automatic driving travel mode is selected, a drive power limit 1 is set in S8-2. If it is determined in S5 that the attended automatic driving travel mode is selected, a drive power limit 2 is set in S9-2. If it is determined in S6 that the cruise travel mode is selected, a drive power limit 3 is set in S10-2. If it is determined in S7 that the driving operation travel mode is selected, a drive power limit 4 is set in S11-2. The drive power limits 1 to 4 suppress frequent gear shifting and restrict an upper limit value of the target drive power Ftag2 on the basis of the downshift lines (the gear shifting lines 1 to 4 in FIG. 6), which are set by the mode-by-mode gear shifting determination section 66, such that downshifting is restricted only in a gear shifting restriction period defined with the last time of gear shifting being a reference. As the contribution of the drive power responsiveness to the driving operation by the driver is decreased, the drive power responsiveness to the acceleration request is less requested. Accordingly, in order to allow the harmonization of frequent gear shifting with the drive power responsiveness, in this embodiment, the drive power limits 1 to 4 are set to satisfy a relationship of the drive power limit 1>the drive power limit 2>the drive power limit 3>the drive power limit 4. More specifically, the drive power limits 1 to 3 restrict the target drive power Ftag2 to have a lower limit value than each of the downshift lines. The gear shifting restriction period is defined to satisfy a relationship of the drive power limit 1>the drive power limit 2>the drive power limit 3. The drive power limit 4 may cross the downshift lines, and the gear shifting restriction period thereof is the shortest. While frequent gear shifting is suppressed by the drive power limits during downshifting, upshifting that is associated with a decrease in the drive power is permitted as is. Thus, the drive power limits 1 to 4 yield a significant effect on the fuel economy.

Figure 19:
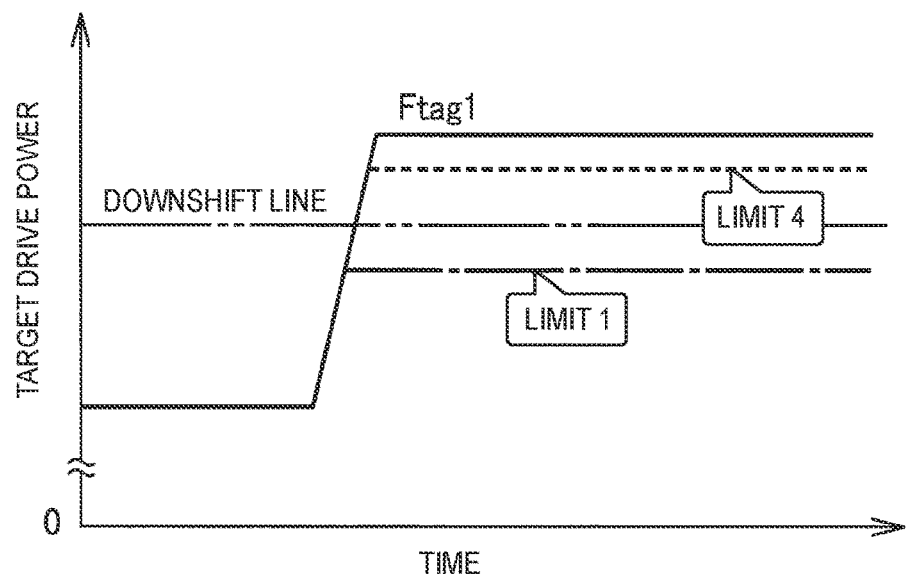
FIG. 19 is one example of a time chart that illustrates a limit 1 and a limit 4 of the drive power set in steps S8-2, S11-2 in FIG. 18.

In the unattended automatic driving travel mode, the occupant is absent, and the drive power responsiveness to the acceleration request is least requested. Thus, the drive power limit 1 may be the largest of the drive power limits 1 to 4. In the attended automatic driving travel mode, the occupant is present in the state of not monitoring the vehicle speed and the acceleration. Accordingly, the drive power limit 2 may be large in consideration of the ride quality, frequent gear shifting, and the like. In the cruise travel mode, the occupant is present in the state of monitoring the vehicle speed and the acceleration. However, because the driver does not perform the acceleration/deceleration operation, the drive power limit 3 may be smaller than that in the automatic driving travel mode but may be larger than that in the driving operation travel mode. In the driving operation travel mode, because the driver himself/herself makes the acceleration/deceleration request in real time, the superior drive power responsiveness is desired, and room to restrict the drive power limit 4 is restricted. FIG. 19 is a time chart that exemplifies a case where the change in the target drive power Ftag1 as the basis is restricted by the drive power limit 1 and the drive power limit 4. Note that the drive power limit 4 in the driving operation travel mode may not restrict the upper value of the target drive power Ftag2. In addition, the gear shifting restriction periods and the limit values of the drive power limits 1 to 3 may respectively be set to be the same.

In S12, the change in the target drive power Ftag1 as the basis is restricted on the basis of the drive power limits 1 to 4, which are set in above S8-2 to S11-2 per travel mode, when necessary. In this way, the final target drive power Ftag2 is computed. Then, the target drive power Ftag2 is output to the target brake force calculation section 140 and is also output to the hybrid control section 52 and the stepped gear shifting control section 54.

Either one of the drive power restriction by the drive power limits 1 to 4, which are set in S8-2 to S11-2 of above FIG. 18, and the drive power restriction by the drive power change rates 1 to 4, which are set in S8 to S11 of FIG. 16, may only be implemented. However, both of these may be implemented in combination.

Returning to FIG. 15, when the target drive power Ftag2 is negative (minus), the target brake force calculation section 140 computes the target brake force Btag of each of the wheel brakes 38, with which the target drive power Ftag2 is obtained in combination with the drive power brake generated by the hybrid control section 52, and outputs the target brake force Btag to the brake control section 58. When the automatic brake system 44 is controlled in accordance with this target brake force Btag, each of the wheel brakes 38 is actuated with the target brake force Btag. In this way, the target drive power Ftag2 is obtained in combination with the drive power brake that is obtained through the control of the hybrid control section 52.

Here, according to the electronic control unit 50 of the vehicular drive apparatus 10 of this embodiment, the execution of gear shifting is suppressed by the gear shifting restriction section 68 and the mode-by-mode drive power control section 138 during the second travel mode (the cruise travel mode and the attended automatic driving travel mode) when compared to the first travel mode (the driving operation travel mode). Thus, frequent gear shifting of the gear stage of the automatic transmission 16 during the second travel mode is suppressed, and the superior ride quality is obtained. Furthermore, as shown in FIG. 6, the amount of the hysteresis in the gear shifting map is smaller in the second travel mode than in the first travel mode. Thus, the duration of the travel at the optimum gear stage is extended during the second travel mode, and the fuel economy is improved. That is, in the second travel mode, the drive power responsiveness to the acceleration/deceleration operation as in the first travel mode is not necessary. Accordingly, even when gear shifting is suppressed, there is a low possibility that the driver feels a sense of discomfort. Thus, even when the gear shifting condition is set to extend the duration of the travel at the optimum gear stage by decreasing the amount of the hysteresis of the gear shifting condition, the drive power responsiveness expected by the driver is not hindered, and frequent gear shifting can be suppressed.

In addition, when the mode-by-mode drive power control section 138 restricts the change rate or the upper limit value of the target drive power Ftag2, the increase amount of the target drive power Ftag2 during the increase is more restricted in the second travel mode than in the first travel mode. Accordingly, in the second travel mode, the rapid change in the drive power is suppressed, and the ride quality is improved. In addition, downshifting that is associated with the increase in the drive power is suppressed, and frequent gear shifting is less likely to be made. More specifically, when the mode-by-mode drive power control section 138 executes the signal processing in accordance with the flowchart in FIG. 16, the drive power change rates 2, 3 in the second travel mode are lower than the drive power change rate 4 in the first travel mode. Thus, the rapid change in the drive power is suppressed, and the ride quality is improved. In addition, downshifting that is associated with the increase in the drive power is suppressed, and frequent gear shifting is less likely to be made. Until the drive power reaches the change rates 2, 3, the drive power is changed in the similar manner to that in the first travel mode. Thus, the drive power performance in the same degree as that in the first travel mode is secured.

When the mode-by-mode drive power control section 138 executes the signal processing in accordance with the flowchart in FIG. 18, the upper limit value of the target drive power Ftag2 is restricted only in the specified gear shifting restriction period from the last gear shifting. In this case, the upper limit value of the target drive power Ftag2 is restricted to be lower in the second travel mode than in the first travel mode. Accordingly, downshifting is suppressed, and frequent gear shifting is less likely to be made. In particular, in this embodiment, in order to restrict downshifting, the upper limit value of the target drive power Ftag2 is restricted to have a lower value than each of the downshift lines (the gear shifting lines 1 to 4 in FIG. 6), which are set by the mode-by-mode gear shifting determination section 66, in the second travel mode. Thus, downshifting is reliably prohibited in the gear shifting restriction period, and frequent gear shifting is prevented.

The gear shifting restriction section 68 of the stepped gear shifting control section 54 prohibits gear shifting under the certain condition when the mode-by-mode gear shifting determination section 66 makes the gear shifting execution determination in the second travel mode. Thus, frequent gear shifting is suppressed. More specifically, when the gear shifting restriction section 68 executes the signal processing in accordance with the flowchart in FIG. 8, the above certain condition is the delay time of the gear shifting output. When the gear shifting restriction section 68 executes the signal processing in accordance with the flowchart in FIG. 11, the above certain condition is the gear shifting determination number. When the gear shifting restriction section 68 executes the signal processing in accordance with the flowchart in FIG. 14, the above certain condition is the gear shifting restriction period. Because those delay time, gear shifting determination number, and gear shifting restriction period are set to be longer or larger in the second travel mode than those in the first travel mode, frequent gear shifting in the second travel mode is appropriately suppressed.

When the drive power is restricted by the mode-by-mode drive power control section 138 in accordance with the flowchart in FIG. 16 or FIG. 18, only downshifting is suppressed, and upshifting is permitted. Thus, while frequent gear shifting is suppressed by suppressing downshifting, the fuel economy can be improved by upshifting. Also, in the cases where gear shifting is restricted by the gear shifting restriction section 68 in accordance with the flowchart in FIG. 8, FIG. 11, or FIG. 14 and where only downshifting is restricted while upshifting is permitted, a similar effect is obtained.

As the second travel mode, the cruise travel mode (the constant speed travel mode and the following travel mode) in which contribution of the driving operation by the driver is relatively large and the automatic driving travel mode in which the contribution of the driving operation is small are provided. During the automatic driving travel mode in which the contribution of the driving operation is small, the gear shifting determination is made in accordance with the gear shifting condition with the smaller amount of the hysteresis than that in the cruise travel mode in which the contribution of the driving operation is large. Accordingly, in the automatic driving travel mode in which the contribution of the driving operation is small, the duration of the travel at the optimum gear stage is further extended while frequent gear shifting is suppressed. Thus, the fuel economy is further improved. That is, in the case of the automatic driving travel mode in which the steering angle Φ is also automatically controlled, the drive power control is executed by predicting situations (curves, up-downs, and the like) of the road ahead of the current position, and thus the drive power is changed more smoothly. Thus, while frequent gear shifting is suppressed, the amount of the hysteresis can further be decreased. The above contribution of the driving operation differs by presence or absence of the steering operation by the driver, presence or absence of a target vehicle speed setting operation by the driver, presence or absence of a preceding vehicle following control selecting operation by the driver, or the like, for example. As the number of the operation by the driver is increased, the contribution of the driving operation is increased.

During the automatic driving travel mode in which the contribution of the driving operation is small, the degree of suppression of gear shifting is larger than that in the cruise travel mode in which the contribution of the driving operation is large (the gear shifting output delay 2>the gear shifting output delay 3, the gear shifting interval 2>the gear shifting interval 3, the gear shifting restriction period 2>the gear shifting restriction period 3, the drive power change rate 2<the drive power change rate 3, the drive power limit 2>the drive power limit 3). Accordingly, even when the amount of the hysteresis is decreased in the automatic driving travel mode in which the contribution of the driving operation is small, frequent gear shifting is appropriately suppressed. Meanwhile, in the cruise travel mode in which the vehicle travels in the constant speed travel mode or the following travel mode, the degree of suppression of gear shifting is small. Accordingly, the superior drive power responsiveness to that in the automatic driving travel mode is obtained by gear shifting. Thus, the appropriate drive power responsiveness can be secured, so as to suppress the change in the vehicle speed and a change in the inter-vehicular distance from the preceding vehicle, which give the sense of discomfort to the driver.

Note that, in the above embodiment, either the control (FIG. 8, FIG. 11, or FIG. 14) that restricts gear shifting and functions as the gear shifting suppression section or the control (FIG. 16 or FIG. 18) that restricts the drive power may only be executed. However, both types of the control can simultaneously be executed in combination.

Figures 20, 21:
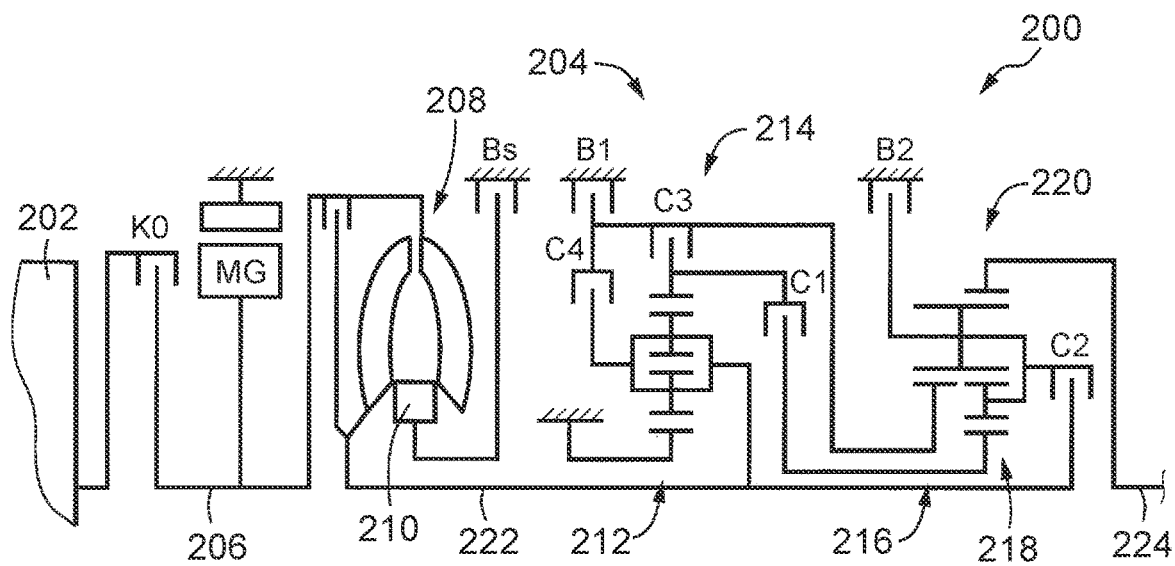
FIG. 20 is a skeletal view that illustrates another example of the dedicated vehicular drive apparatus for the hybrid vehicle, to which the disclosure is favorably applied.
FIG. 21 is an engagement actuation table that illustrates plural gear stages of an automatic transmission and friction engagement devices for establishing the plural gear stages in FIG. 20.

In addition, in the above embodiment, the description has been made on the vehicular drive apparatus 10 that has the electric-type differential section 14 and the automatic transmission 16, which allows gear shifting of the four forward gear stages. However, the disclosure can be applied to various types of vehicle control apparatuses, and, for example, the disclosure can be applied to a vehicular drive apparatus 200 shown in FIG. 20. The vehicular drive apparatus 200 of FIG. 20 is related to a hybrid vehicle that includes an engine 202 and a motor generator MG as drive power sources and that has an automatic transmission 204 capable of gear shifting of eight forward gear stages. The engine 202 is coupled to a motor shaft 206 of the motor generator MG via an engagement/disengagement clutch K0, and output of each of those engine 202 and motor generator MG is transmitted from the motor shaft 206 to an input shaft 222 of the automatic transmission 204 via a torque converter 208. Rotation of a stator (a guide vane) 210 of the torque converter 208 is selectively stopped by a stator brake Bs.

The automatic transmission 204 includes a first transmission section 214 and a second transmission 220 on a common axis. The first transmission section 214 is configured by including a first planetary gear device 212 of a double pinion type as a main body, and the second transmission 220 is configured by including a second planetary gear device 216 of the single pinion type and a third planetary gear device 218 of the double pinion type as main bodies. The automatic transmission 204 changes a speed of the rotation of the input shaft 222, outputs the changed speed from an output shaft 224, and rotationally drives right and left drive wheels via a final reduction gear, which is not shown, and the like. The second planetary gear device 216 and the third planetary gear device 218 constitute a planetary gear train of a Ravigneaux type in which carriers and ring gears thereof are each constructed of a common member and in which a pinion gear of the second planetary gear device 216 also serves as a second pinion gear (an outer pinion gear) of the third planetary gear device 218. This automatic transmission 204 is provided with four clutches C1 to C4 and two brakes B1, B2 (hereinafter simply referred to as clutches C and brakes B when not particularly distinguished) as hydraulic friction engagement devices. As shown in an engagement actuation table of FIG. 21, when any two of those clutches C and brakes B are engaged, eight forward gear stages 1st to 8th and two reverse gear stages Rev1, Rev2 are established. When all of the clutches C and the brakes B are disengaged, N (neutral) in which the power transmission is cut is established.

Also with such a vehicular drive apparatus 200, the vehicle can travel in the driving operation travel mode, the cruise travel mode, the attended automatic driving travel mode, and the unattended automatic driving travel mode when being provided with the engine output controller 40, the hydraulic control circuit 42, the automatic brake system 44, the automatic steering system 46, the electronic control unit 50, and the like. In addition, similar operational effects to those in the embodiment are obtained when the gear shifting control and the drive power control are executed per travel mode by the stepped gear shifting control section 54 and the mode-by-mode drive power control section 138.

The detailed description has been made so far on the embodiment of the disclosure on the basis of the drawings. However, this is merely one embodiment, and the disclosure can be implemented in aspects by making various modifications and improvements on the basis of knowledge of a person skilled in the art.

What is claimed is:

1. A vehicle comprising:
 a drive power source;
 an automatic transmission configured to establish plural gear stages, each of the plural gear stages has a different gear ratio; and
 an electronic control unit configured to:
  execute (A) a first travel mode in which drive power control and gear shifting control of the automatic transmission are executed in accordance with an acceleration and deceleration operation by a driver, and (B) a second travel mode in which a target travel state is set without depending on the acceleration and deceleration operation in a state in which the drive power control and the gear shifting control are executed,
  execute a gear shifting determination on whether to perform gear shifting in the second travel mode in accordance with a gear shifting condition with a first amount of hysteresis that is less than a second amount of hysteresis in the first travel mode, and
  suppress gear shifting by at least one of an upshift condition and a downshift condition more in the second travel mode than in the first travel mode by, in the second travel mode, (1) extending a gear shifting restriction period in which gear shifting is suppressed, (2) extending a delay time until a gear shifting command is output, or (3) increasing a number of gear shifting determinations, wherein:
as a gear shifting condition of the gear shifting control, an upshift condition and a downshift condition is defined based on a parameter related to drive power and a parameter related to a vehicle speed,
an amount of a hysteresis between a specified upshift condition and a specified downshift condition in the first travel mode is different from the amount of the hysteresis between the specified upshift condition and the specified downshift condition in the second travel mode.

2. The vehicle according to claim 1, wherein
the electronic control unit is configured to suppress gear shifting by restricting an increase amount of the drive power within a specified time more in the second travel mode than in the first travel mode, and
the specified time is a time in which the drive power is increased.

3. The vehicle according to claim 2, wherein the electronic control unit is configured to make an upper limit of a change rate of the drive power in the specified time in the second travel mode smaller than the upper limit of the change rate of the drive power in the specified time in the first travel mode.

4. The vehicle according to claim 1, wherein
in a gear shifting restriction period, the electronic control unit is configured to make an upper limit value of the drive power in the second travel mode smaller than the upper limit value of the drive power in the first travel mode, and
the gear shifting restriction period is a predetermined period after the gear shifting is executed.

5. The vehicle according to claim 4, wherein the electronic control unit is configured to restrict the upper limit value of the drive power within a range where a current gear stage is maintained based on the gear shifting condition in the second travel mode.

6. The vehicle according to claim 1, wherein the electronic control unit is configured to execute the gear shifting based on a predetermined condition when the electronic control unit makes the determination to perform gear shifting in the second travel mode.

7. The vehicle according to claim 6, wherein
the electronic control unit is configured to not execute the gear shifting until a delay time elapses,
the delay time is a time until the electronic control unit outputs a gear shifting command after the electronic control unit makes the determination to perform gear shifting, and
the delay time in the second travel mode is longer than the delay time in the first travel mode.

8. The vehicle according to claim 6, wherein
the electronic control unit is configured to not execute the gear shifting until a determination number reaches a specified determination number,
the determination number is a predetermined parameter upon which the electronic control unit makes the determination to perform gear shifting, and
the specified determination number in the second travel mode is greater than the specified determination number in the first travel mode.

9. The vehicle according to claim 6, wherein
the electronic control unit is configured to not execute the gear shifting when the electronic control unit makes the determination to perform gear shifting in a gear shifting restriction period, and
the gear shifting restriction period in the second travel mode is greater than the gear shifting restriction period in the first travel mode.

10. The vehicle according to claim 1, wherein the electronic control unit is configured to suppress the downshifting by only the downshift condition, and to permit the upshifting only by the upshift condition.

11. The vehicle according to claim 1, wherein
the second travel mode includes plural travel modes in which contribution of a driving operation by the driver differs,
the electronic control unit is configured to make the gear shifting determination in accordance with the gear shifting condition with a first amount of the hysteresis within a first specified time that is less than a second amount of the hysteresis within a second specified time,
the first specified time is a time in the second travel mode in which the contribution of the driving operation is small, and
the second specified time is a time in the second travel mode in which the contribution of the driving operation is large.

12. The vehicle according to claim 11, wherein the electronic control unit is configured to increase a degree of suppression of gear shifting that is larger in the first specified time than in the second specified time.

13. The vehicle according to claim 1, wherein
the second travel mode includes a constant speed travel mode and an automatic driving travel mode,
the constant speed travel mode is a mode in which the vehicle travels at a target vehicle speed set by the driver being the target travel state and in which the driver operates a steering angle,
the automatic driving travel mode is a mode in which, in addition to the drive power control and the gear shifting control, the vehicle travels by automatically controlling the steering angle based on road information, and
the electronic control unit is configured to make the gear shifting determination in the automatic driving travel mode in accordance with the gear shifting condition with a smaller amount of the hysteresis than an amount of the hysteresis in the constant speed travel mode.

14. The vehicle according to claim 13, wherein the electronic control unit is configured to increase a degree of suppression of gear shifting in the automatic driving travel mode greater than in the constant speed travel mode.

15. The vehicle according to claim 1, wherein
the second travel mode includes a following travel mode and an automatic driving travel mode,
the following travel mode is a mode in which target drive power that allows the vehicle to make a following travel with respect to a preceding vehicle is calculated, in which the vehicle travels with the target drive power being the target travel state, and in which the driver operates a steering angle,
the automatic driving travel mode is a mode in which, in addition to the drive power control and the gear shifting control, the vehicle travels by automatically controlling the steering angle based on road information, and
the electronic control unit is configured to make the gear shifting determination in the automatic driving travel mode in accordance with the gear shifting condition with a smaller amount of the hysteresis than an amount of the hysteresis in the following travel mode.

16. The vehicle according to claim 15, wherein the electronic control unit is configured to increase a degree of suppression of gear shifting in the automatic driving travel mode greater than in the following travel mode.

17. A control method for a vehicle including: (i) a drive power source, (ii) an automatic transmission configured to establish plural gear stages that each have a different gear ratio, and (iii) an electronic control unit, the control method comprising:
   executing, by the electronic control unit, (A) a first travel mode in which drive power control and gear shifting control of the automatic transmission are executed in accordance with an acceleration and deceleration operation by a driver or a second travel mode, and (B) a second travel mode in which a target travel state is set without depending on the acceleration and deceleration operation in a state in which the drive power control and the gear shifting control are executed;
   executing, by the electronic control unit, a gear shifting determination on whether to perform gear shifting in the second travel mode in accordance with a gear shifting condition with a first amount of hysteresis that is less than a second amount of hysteresis in the first travel mode; and
   suppressing, by the electronic control unit, gear shifting by at least one of an upshift condition and a downshift condition more in the second travel mode than in the first travel mode by, in the second travel mode, (1) extending a gear shifting restriction period in which gear shifting is suppressed, (2) extending a delay time until a gear shifting command is output, or (3) increasing a number of gear shifting determinations, wherein:
   as the gear shifting condition of the gear shifting control, the upshift condition and the downshift condition being defined based on a parameter related to drive power and a parameter related to a vehicle speed, and
   an amount of the hysteresis between a specified upshift condition and a specified downshift condition in the first travel mode is different from the amount of the hysteresis between the specified upshift condition and the specified downshift condition in the second travel mode.

18. The vehicle according to claim 1, wherein the second travel mode includes an automatic driving travel mode that is a mode in which, in addition to the drive power control and the gear shifting control, the vehicle travels by automatically controlling the steering angle based on road information.

19. The method for the vehicle according to claim 17, wherein the second travel mode includes an automatic driving travel mode that is a mode in which, in addition to the drive power control and the gear shifting control, the vehicle travels by automatically controlling the steering angle based on road information.

* * * * *